US010734707B2

(12) United States Patent
Suzuki

(10) Patent No.: US 10,734,707 B2
(45) Date of Patent: Aug. 4, 2020

(54) ANTENNA, RADIO DEVICE, MOUNTING DEVICE, AND CHARGING DEVICE

(71) Applicant: NEC Platforms, Ltd., Kawasaki-shi, Kanagawa (JP)

(72) Inventor: Masaki Suzuki, Kanagawa (JP)

(73) Assignee: NEC PLATFORMS, LTD., Kanagawa (JP)

( * ) Notice: Subject to any disclaimer, the term of this patent is extended or adjusted under 35 U.S.C. 154(b) by 189 days.

(21) Appl. No.: 15/738,709

(22) PCT Filed: Mar. 23, 2016

(86) PCT No.: PCT/JP2016/001659
§ 371 (c)(1),
(2) Date: Dec. 21, 2017

(87) PCT Pub. No.: WO2017/013818
PCT Pub. Date: Jan. 26, 2017

(65) Prior Publication Data
US 2018/0183135 A1   Jun. 28, 2018

(30) Foreign Application Priority Data
Jul. 17, 2015   (JP) .................................. 2015-142796

(51) Int. Cl.
*H01Q 1/24* (2006.01)
*H01Q 9/42* (2006.01)
*H02J 7/00* (2006.01)

(52) U.S. Cl.
CPC ............... *H01Q 1/242* (2013.01); *H01Q 9/42* (2013.01); *H02J 7/00* (2013.01); *H02J 7/0044* (2013.01); *H02J 7/0042* (2013.01)

(58) Field of Classification Search
CPC .......... H01Q 1/243; H01Q 1/242; H01Q 9/42; H02J 7/00; H02J 7/0044; H02J 7/0042
See application file for complete search history.

(56) References Cited

U.S. PATENT DOCUMENTS 9,048,528 B1   6/2015   Lee et al.
2005/0237247 A1   10/2005   Kinnunen et al.
(Continued)

FOREIGN PATENT DOCUMENTS

CN   1720638 A   1/2006
CN   101821900 A   9/2010
(Continued)

OTHER PUBLICATIONS

International Search Report for PCT Application No. PCT/JP2016/001659, dated Jun. 14, 2016.
(Continued)

*Primary Examiner* — Dieu Hien T Duong

(57) ABSTRACT

In order to implement an external antenna of a radio device with a simple configuration, an antenna according to the present invention includes: a conductor plate; a first linear conductor including a portion disposed substantially in parallel to an edge of the conductor plate, and being curved halfway and connected to the conductor plate with a gap being interposed; a second linear conductor intersecting with a line extending from an end of the first linear conductor opposite to a connection end thereof connected to the conductor plate, and being connected to the conductor plate; a third linear conductor being connected to an end of the second linear conductor opposite to an end thereof connected to the conductor plate, and being disposed substantially in parallel to the first linear conductor; and a fourth linear conductor being disposed in a direction apart from the conductor plate at an end of the third linear conductor opposite to an end thereof connected to the second linear conductor.

7 Claims, 35 Drawing Sheets

(56) References Cited

U.S. PATENT DOCUMENTS

| | | | |
|---|---|---|---|
| 2006/0028380 A1 | 2/2006 | Harano | |
| 2008/0180333 A1* | 7/2008 | Martiskainen | H01Q 1/243 343/722 |
| 2010/0214175 A1 | 8/2010 | Hui et al. | |
| 2013/0135150 A1* | 5/2013 | Kenoun | H01Q 9/0421 343/700 MS |
| 2014/0232612 A1* | 8/2014 | Jenwatanavet | H01Q 1/521 343/893 |

FOREIGN PATENT DOCUMENTS

| | | |
|---|---|---|
| CN | 204067570 U | 12/2014 |
| JP | 2006-050496 A | 2/2006 |
| JP | 2007-288561 A | 11/2007 |
| JP | 2007-318595 A | 12/2007 |
| JP | 2008-060899 A | 3/2008 |
| JP | 2010-109769 A | 5/2010 |
| JP | 2010-119002 A | 5/2010 |
| JP | 2010-232820 A | 10/2010 |
| JP | 2012-213231 A | 11/2012 |
| JP | 2013-214865 A | 10/2013 |
| JP | 2014-140094 A | 7/2014 |
| JP | 2014-225784 A | 12/2014 |

OTHER PUBLICATIONS

English translation of Written opinion for PCT Application No. PCT/JP2016/001659.
Chinese Office Action for CN Application No. 201680041888.0 dated Dec. 3, 2019 with English Translation.

\* cited by examiner

Fig.10
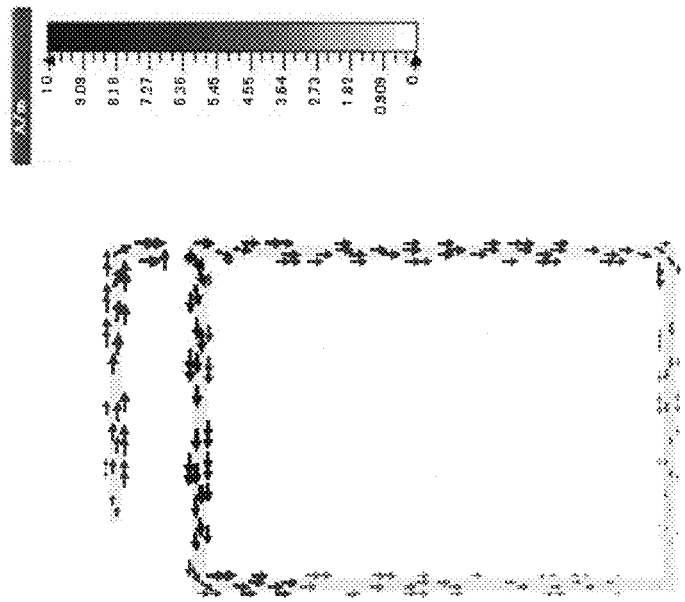
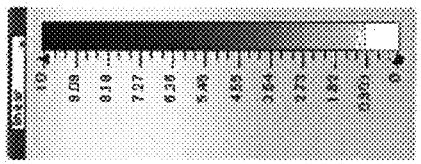
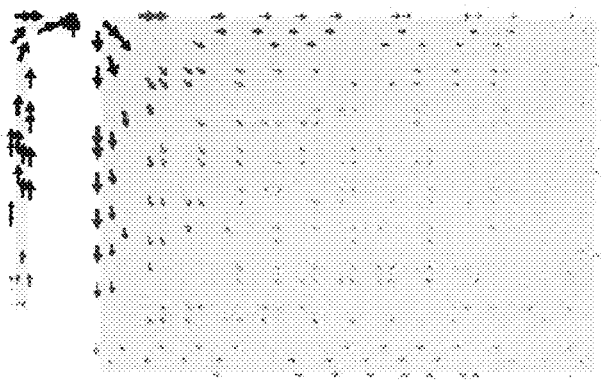

ANTENNA, RADIO DEVICE, MOUNTING DEVICE, AND CHARGING DEVICE

This application is a National Stage Entry of PCT/JP2016/001659 filed on Mar. 23, 2016, which claims priority from Japanese Patent Application 2015-142796 filed on Jul. 17, 2015, the contents of all of which are incorporated herein by reference, in their entirety.

TECHNICAL FIELD

The present invention relates to an antenna, a radio device, a mounting device, and a charging device.

BACKGROUND ART

It is important to downsize appearance of a mobile radio device such as a cellular phone, a smartphone, and a mobile router. Many of such mobile radio devices each have an antenna for communication built in a housing.

Dimensions of each antenna element in the antennas may be set to be shorter than a wavelength corresponding to a resonance frequency so that the antenna can be built within dimensions of a housing, which may cause deterioration in antenna performance due to reduction in the dimensions of each antenna element.

Accordingly, in order to ensure communication performance, particularly, at a location where a radio wave environment is poor and the like, an external antenna a length of which is not reduced with respect to the wavelength corresponding to the resonance frequency may be used instead of the built-in antenna with a reduced length, to thereby enhance antenna performance.

Then, as a configuration described in PTL 1, there is a configuration in which an external antenna is placed on a cradle (also referred to as a desktop holder, which also serves as a charging station) of a radio device.

FIG. 36 illustrates an example of a cradle 160 on which an external antenna 161 is placed, and an example of a radio device 150 placed on the cradle 160.

Note that PTLs 2 to 6 disclose techniques for improving performance of an antenna.

CITATION LIST

Patent Literature

[PTL 1] Japanese Unexamined Patent Application Publication No. 2007-318595
[PTL 2] Japanese Unexamined Patent Application Publication No. 2012-213231
[PTL 3] Japanese Unexamined Patent Application Publication No. 2010-119002
[PTL 4] Japanese Unexamined Patent Application Publication No. 2010-109769
[PTL 5] Japanese Unexamined Patent Application Publication No. 2007-288561
[PTL 6] Japanese Unexamined Patent Application Publication No. 2006-050496

SUMMARY OF INVENTION

Technical Problem

The radio device 150 illustrated in FIG. 36 is capable of performing radio communication alone without being placed on the cradle 160. When the radio device 150 is not placed on the cradle, a switch 153 connects a radio circuit 152 with a built-in antenna 151 to thereby enable radio communication. A transmission line 154 and a connector 155 are connected to an opposite side of the switch 153 to a side where the built-in antenna is connected.

Further, the cradle 160 includes a connector 162 that is connectable to the connector 155. The connector 162 is connected to a transmission line 163, and an external antenna 161 is connected to a leading end of the transmission line 163.

When the radio device 150 is placed on the cradle 160 and the connector 155 is connected to the connector 162 of the cradle 160, the switch 153 is switched to connect the radio circuit 152 and the transmission line 154 and disconnect the built-in antenna 151. The switch 153 may be switched by switching a mechanical contact point of the connector 155, or a control unit may switch the switch by electrically detecting connection of the connector 155.

In this manner, when the radio device 150 is placed on the cradle 160, the radio device 150 is disconnected from the built-in antenna 151 and connected to the external antenna 161.

As described above, the radio device 150 and the cradle 160 illustrated in FIG. 36 use a plurality of components, such as a switch, a transmission line, and a connector, and thus have a complicated configuration. These components deal with high frequencies, and thus are expensive. Accordingly, connection between the radio device and the external antenna is required to be implemented with a simpler configuration than the configuration examples of the radio device 150 and the cradle 160 illustrated in FIG. 36.

A radio device according to the present invention aims to implement an external antenna of the radio device with a simple configuration.

Solution to Problem

In order to attain the above-described object, an antenna according to the present invention includes: a conductor plate; a first linear conductor including a portion disposed substantially in parallel to an edge of the conductor plate, and being curved halfway and connected to the conductor plate with a gap being interposed; a second linear conductor intersecting with a line extending from an end of the first linear conductor opposite to a connection end thereof connected to the conductor plate, and being connected to the conductor plate; a third linear conductor being connected to an end of the second linear conductor opposite to an end thereof connected to the conductor plate, and being disposed substantially in parallel to the first linear conductor; and a fourth linear conductor being disposed in a direction apart from the conductor plate at an end of the third linear conductor opposite to an end thereof connected to the second linear conductor.

Advantageous Effects of Invention

According to the present invention, an external antenna of a radio device can be implemented with a simple configuration.

BRIEF DESCRIPTION OF DRAWINGS

FIG. 10 is a diagram illustrating an operation of the first example embodiment.

DESCRIPTION OF EMBODIMENTS

First Example Embodiment

Next, example embodiments of the present invention will be described in detail with reference to the drawings.

[Description of Configuration]

Figure 1:
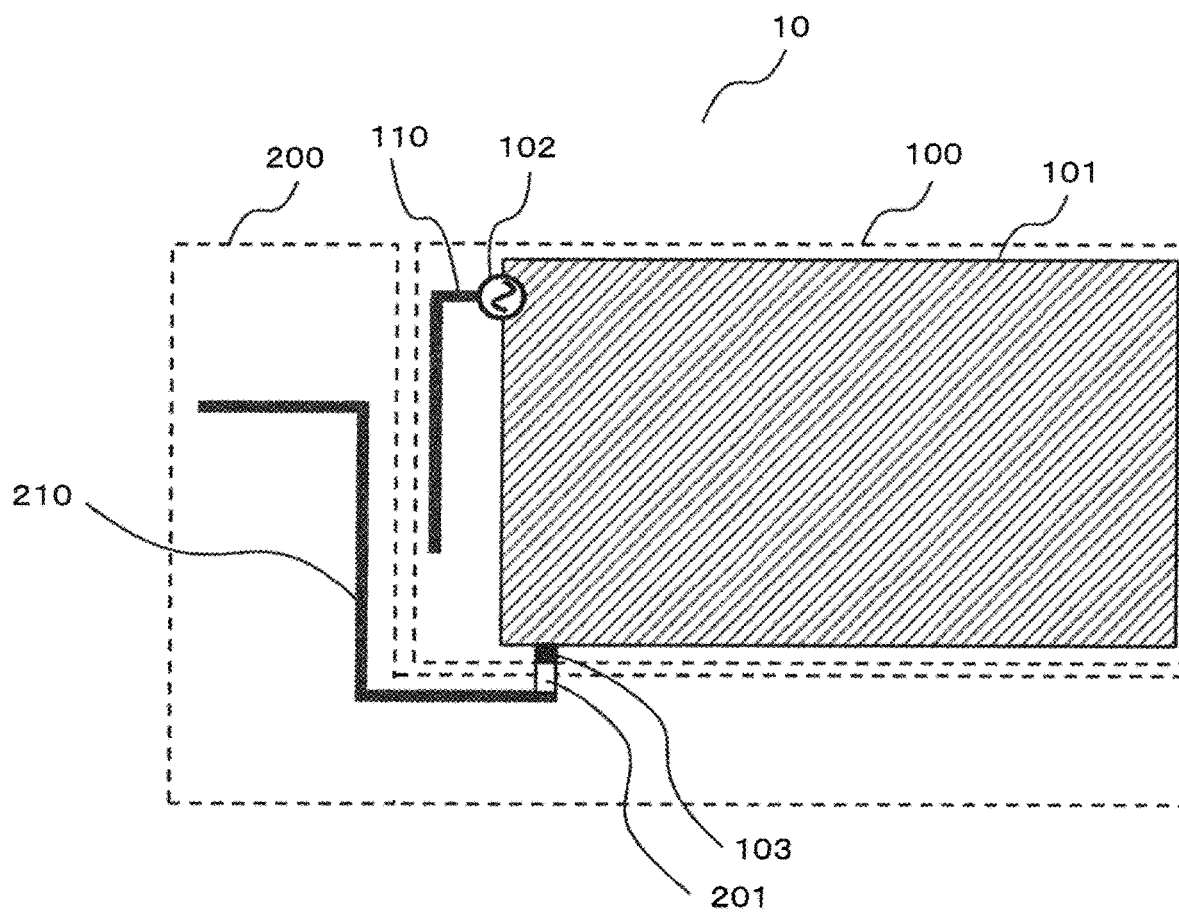
FIG. 1 is a diagram illustrating a configuration example of a first example embodiment.

FIG. 1 illustrates a configuration of a first example embodiment.

A radio device 10 according to the present example embodiment includes a radio device 100 and a cradle 200. It is assumed that the radio device 100 is a mobile radio device such as a smartphone or a mobile router. The cradle 200 is a cradle used to place the radio device 100 at a predetermined position, and is also referred to as a desktop holder or the like. In general, the outer shape of the radio device 100 varies depending on the type of the device. Accordingly, the cradle 200 is prepared for each type of radio device in many cases.

The radio device 100 includes a conductor plate 101, an antenna 110, a power feed unit 102, and a terminal 103, and the exterior of the radio device 100 is generally covered with a synthetic resin case. The conductor plate 101 is an earth conductor for a mounting part of an electric circuit such as a transmission/reception circuit or a signal processing circuit. The antenna 110 is an antenna for performing radio communication, and is formed of a conductive material having a linear shape or an elongated plate shape, such as copper, brass, or aluminum. Alternatively, the antenna 110 may be formed as a conductor pattern of a printed wiring board.

The antenna 110 is generally disposed at an end of the radio device 100, as in the radio device 100 illustrated in FIG. 1. The length of the antenna 110 is, for example, about ¼ of a wavelength corresponding to a communication frequency, and the width of the linear or plate-like conductor is sufficiently smaller than the wavelength and is, for example, about 1/100 of the wavelength. Even when the length of the antenna 110 is not about ¼ of the wavelength corresponding to the communication frequency, the length of the antenna has no influence on the essential effects of the present invention.

The power feed unit 102 is a high-frequency signal input/output end to be connected to the antenna 110 and the radio circuit. The power feed unit 102 has two terminals. One of the terminals is connected to the antenna 110, and the other one of the terminals is connected to the conductor plate 101. The both terminals are generally disposed as close to each other as possible. As illustrated in FIG. 1, the power feed unit 102 is disposed at a position apart from a surface (a lower surface of the radio device 100 illustrated in FIG. 1) of the radio device 100 in contact with the cradle 200 when the radio device 100 is placed on the cradle 200.

Further, the terminal 103 is terminal that is connected to the conductor plate 101, is provided so as to contact a connecting portion 201 of the cradle 200 when the radio device 100 is placed on the cradle 200, and is made of a conductive material. As illustrated in FIG. 1, the terminal 103 is desirably disposed at a position that is as close to the antenna 110 as possible at a surface (a lower surface of the radio device 100 illustrated in FIG. 1) of the radio device 100 in contact of the cradle 200 when the radio device 100 is placed on the cradle 200. Instead of using the terminal 103, the conductor plate 101 may be exposed through a hole, which is formed in a part of the housing, so that the connecting portion 201 of the cradle 200 directly contacts the conductor plate 101 of the radio device 100.

Next, the cradle 200 is a cradle used to place the radio device 100 at a predetermined position, and the exterior of the cradle 200 is covered with synthetic resin and is composed of an antenna 210 and a connecting portion 201.

The connecting portion 201 is a contact member made of a conductive material for electrically connecting the antenna 210 to the terminal 103 of the radio device 100 when the radio device 100 is placed on the cradle 200. The connecting portion 201 is composed of, for example, a metallic spring.

Herein, the connecting portion 201 and the terminal 103 are parts that connect the conductor (antenna 210) to the earth conductor. Accordingly, the connecting portion 201 and the terminal 103 need not necessarily be components for high-frequencies, but instead any part may be used as long as the part has a contact resistance that is as small as a DC electrical contact.

Figure 2:
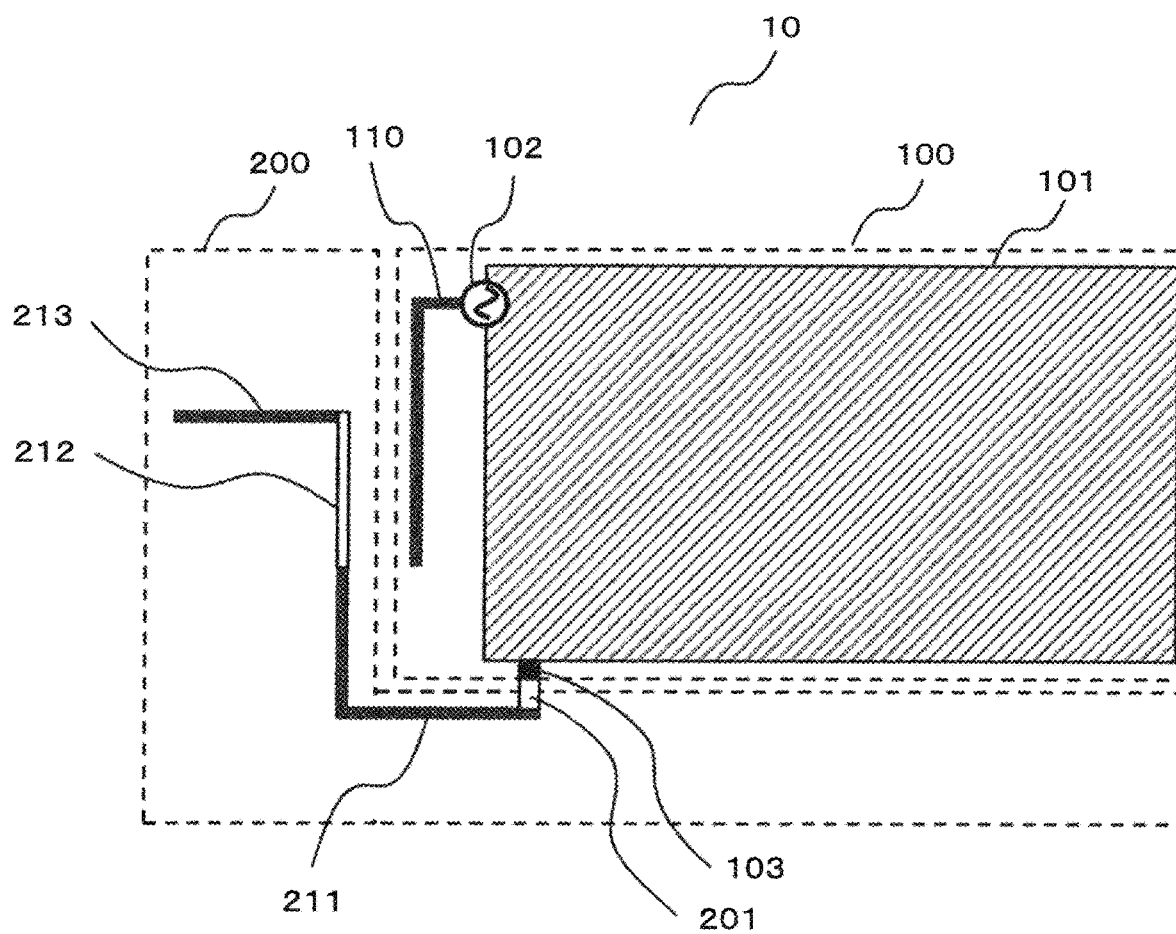
FIG. 2 is a diagram illustrating a configuration example of the first example embodiment.

The antenna 210 further includes three elements, i.e., an element 211, an element 212, and an element 213 illustrated in FIG. 2. These elements are each formed of a linear or elongated plate-like conductive material, such as copper, brass, or aluminum. The antenna 210 may be formed as a conductor pattern of a printed wiring board. The elements of the antenna 210 may be integrally formed.

Next, the element 211 electrically connects the connecting portion 201 to the element 212, and the length of the element 211 is set to be as short as possible, as long as the element 211 is apart from the antenna 110 of the radio device 100 by a predetermined interval or more and the arrangement conditions, which are described below, for the element 212 are satisfied. Herein, the predetermined interval is, for example, 0.01 times or more the wavelength corresponding to the communication frequency, and is 4 mm or more when the frequency is 800 MHz.

The element 212 is disposed in parallel to a linear portion including a leading end of the antenna 110 when the radio device 100 is placed on the cradle 200. When the interval of the parallel portion between the element 212 and the antenna 110 is extremely small, space coupling between the element 212 and the antenna 110 is extremely strong. As a result, when the radio device 100 is placed on the cradle 200, the resonance frequency of the antenna 110 deviates from that before the radio device 100 is placed on the cradle 200, so that the reflection of the antenna 110 in the power feed unit 102 becomes large, which leads to deterioration in high-frequency characteristics.

On the other hand, when the interval between the element 212 and the antenna 110 is extremely large, space coupling between the antenna 110 and the antenna 210 is weakened, which leads to a reduction in the effect of improving high-frequency characteristics of the antenna 210 as the external antenna.

Thus, the interval of the parallel portion between the element 212 and the antenna 110 is determined to be an appropriate value after confirming the effects due to the above-described space coupling at the time of design through calculations and experiments.

As a suitable example of the interval of the parallel portion between the element 212 and the antenna 110, it is confirmed through calculations that the interval is 0.01 to 0.03 times the wavelength corresponding to the communication frequency. For example, when the frequency is 800 MHz, the interval is about 4 mm to 11 mm. However, even when the interval of the parallel portion between the element 212 and the antenna 110 is a value other than these values, the interval has no influence on the essential effects of the present invention.

It is confirmed through calculations that the length of the element 212 is set to be about half the length (length in the longitudinal direction of the antenna 110 illustrated in FIG. 2) of the parallel portion of the element 212 including an open leading end of the antenna 110, thereby increasing the antenna efficiency. However, even when the parallel portion between the element 212 and the antenna 110 has a length other than that described above, the length has no influence on the essential effects of the present invention.

Next, as illustrated in FIG. 2, one end of the element 213 is connected to an end of the element 212 that is not connected to the element 211, and is disposed at a right angle to the element 212 in a direction apart from the radio device 100. The element 213 may be formed in a shape that is bent halfway as described below, to thereby downsize the element.

Figure 3:
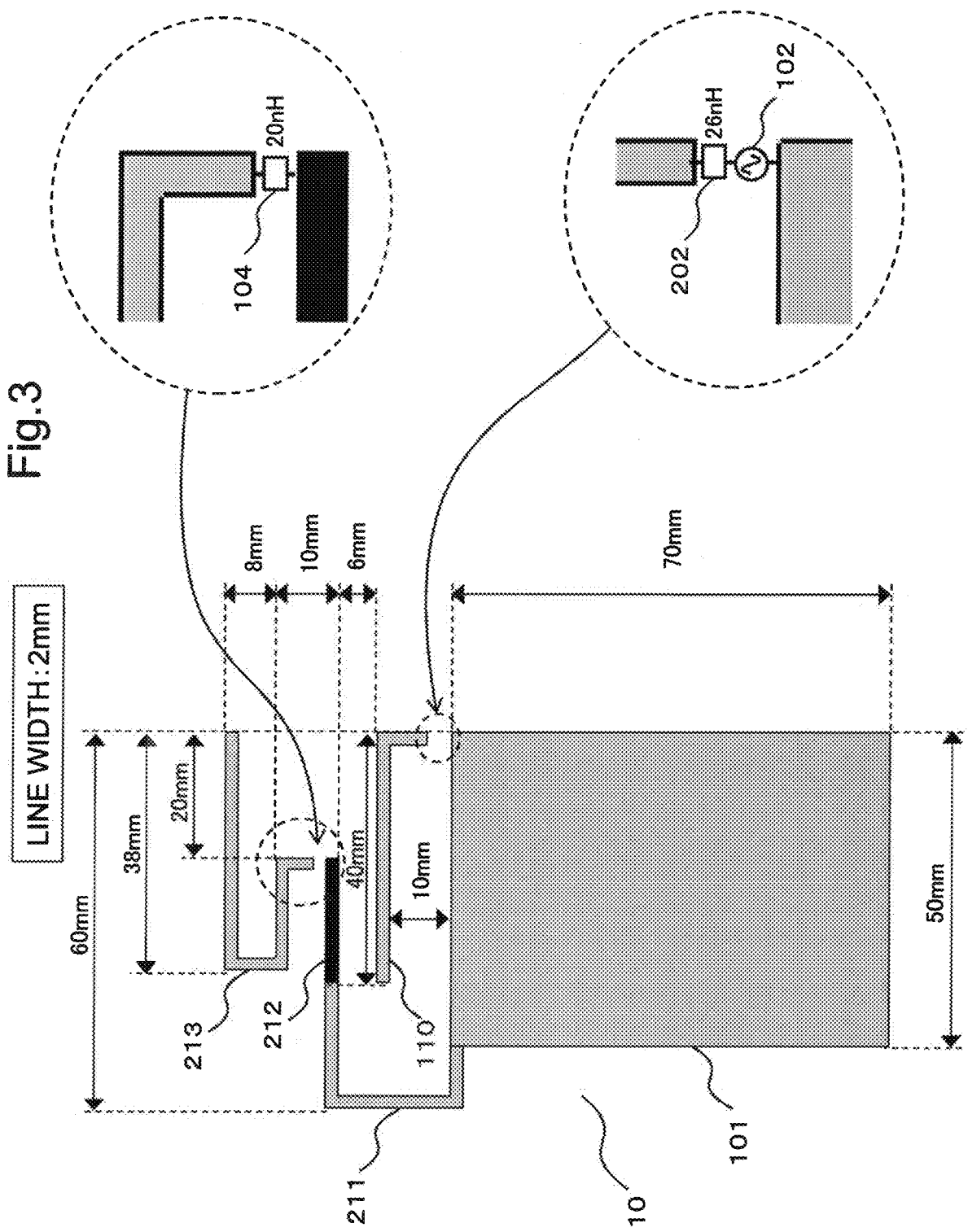
FIG. 3 is a diagram illustrating a configuration example of the first example embodiment.

Note that illustrated in FIG. 3, an inductor 202 may be disposed between the antenna 110 and the power feed unit 102 of the radio device 100 to match the impedance of the power feed unit with the impedance of the antenna 110.

An inductor 104 may be disposed at an intermediate portion of the antenna 210, for example, between the connecting portion 201 and the element 211 of the cradle 200, or between the element 212 and the element 213. The inductor 104 is disposed to adjust the resonance frequency when the antenna 210 cannot have an originally required length due to constraints and the like in mounting.

FIG. 3 illustrates a configuration example of the radio device 10 that performs communication in the vicinity of 800 MHz based on the above-described requirements. FIG. 3 illustrates a state where the radio device 100 is placed on the cradle 200. The element 213 is not linear, but is bent halfway at a right angle for mounting the cradle 200.

As described above, to achieve impedance matching and adjustment of the resonance frequency, the inductor 202 of 26 nH is disposed between the antenna 110 and the power feed unit 102, and the inductor 104 of 20 nH is disposed between the element 212 and the element 213.

[Description of Operation]

Next, an operation of the present example embodiment will be described.

A high-frequency current distribution and high-frequency characteristics described herein are obtained as a result of calculations by an electromagnetic field numerical analysis.

Figure 4:
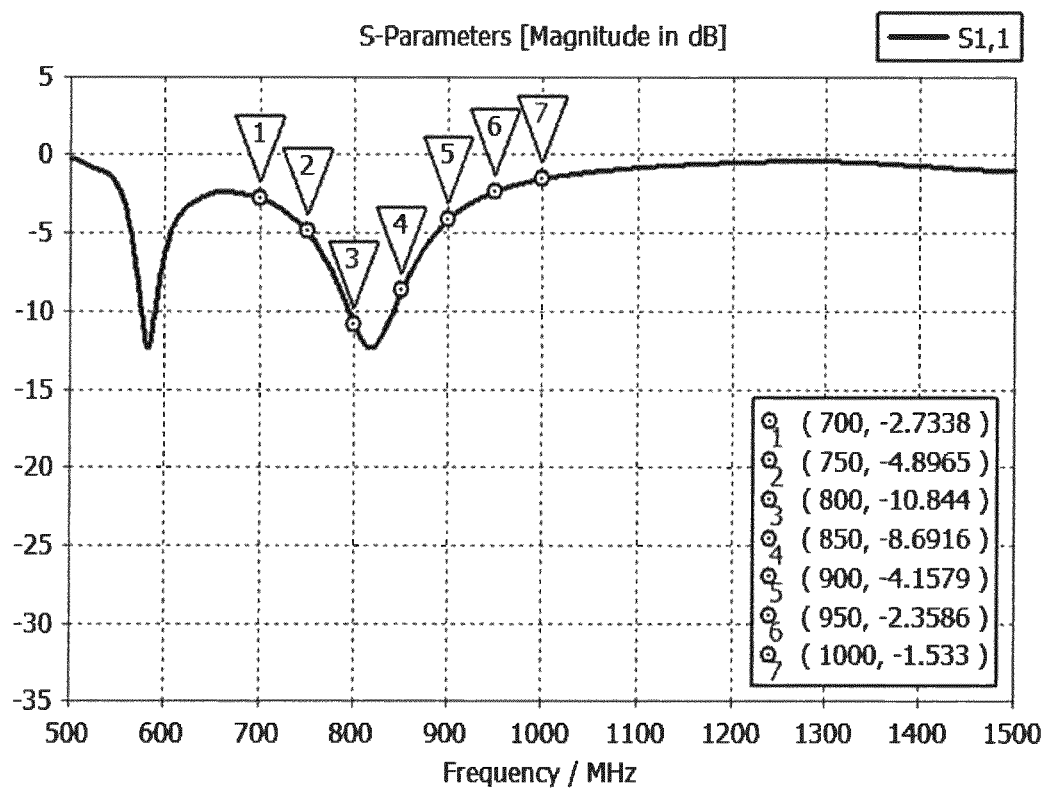
FIG. 4 is a graph illustrating an operation of the first example embodiment.
Figure 5:
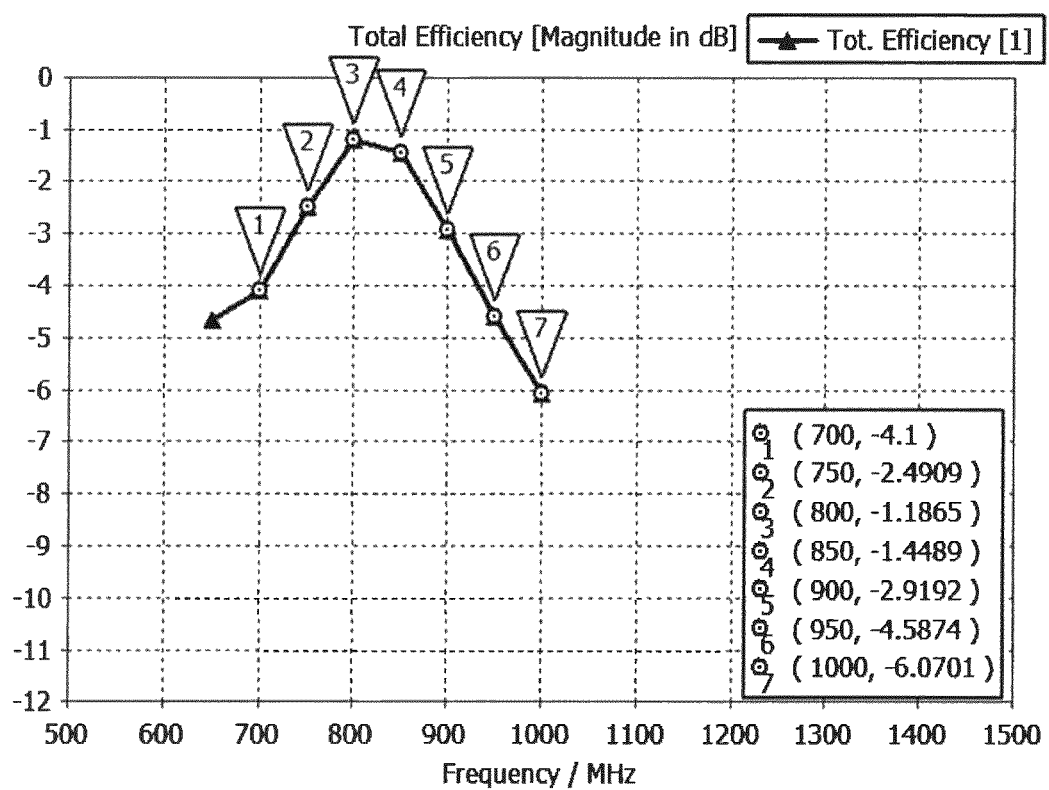
FIG. 5 is a graph illustrating an operation of the first example embodiment.

As for the model of the radio device 10 illustrated in FIG. 3, high-frequency characteristics are illustrated in FIGS. 4 and 5. FIG. 4 illustrates a reflection loss of the antenna 110 that is observed from the power feed unit 102. The horizontal axis represents a frequency in mega-Hertz, and the vertical axis represents a minus value of a reflection loss in decibel. The indication of axes in the other graphs illustrating the reflection loss is similar to that described above.

FIG. 5 illustrates an antenna efficiency which is a ratio between a total electric power of radio waves radiated from the radio device 10 and an electric power to be supplied to the power feed unit 102. Herein, the total electric power of radio waves radiated from the radio device 10 is a total value of electric power of radio waves radiated from all conductors of the radio device 10 including the antenna portion.

In FIG. 5, the horizontal axis represents a frequency in mega-Hertz, and the vertical axis represents an antenna efficiency in decibel. The indication of axes in the other graphs illustrating the antenna efficiency is similar to that described above.

Next, a simple model of the radio device 100 used for the following description will be described.

Figure 6:
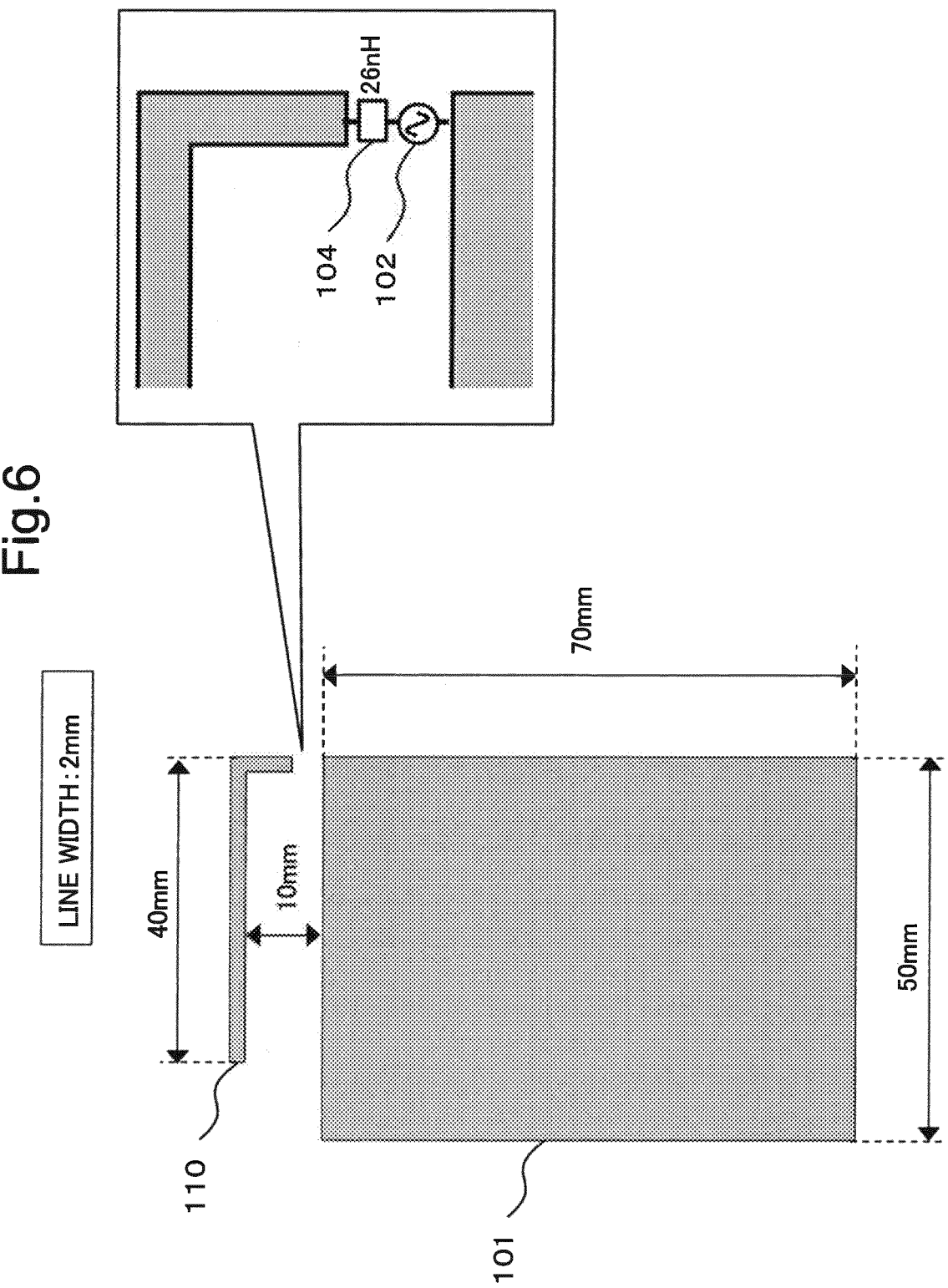
FIG. 6 is a diagram illustrating an operation of the first example embodiment.
Figure 7:
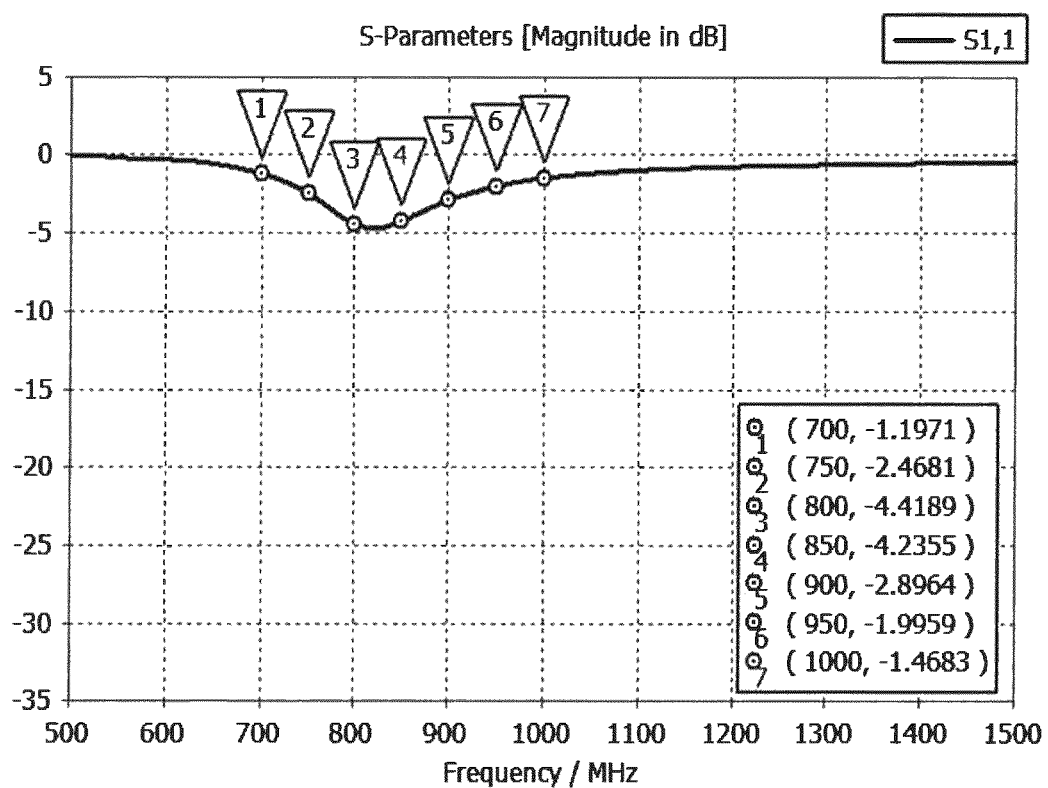
FIG. 7 is a graph illustrating an operation of the first example embodiment.
Figure 8:
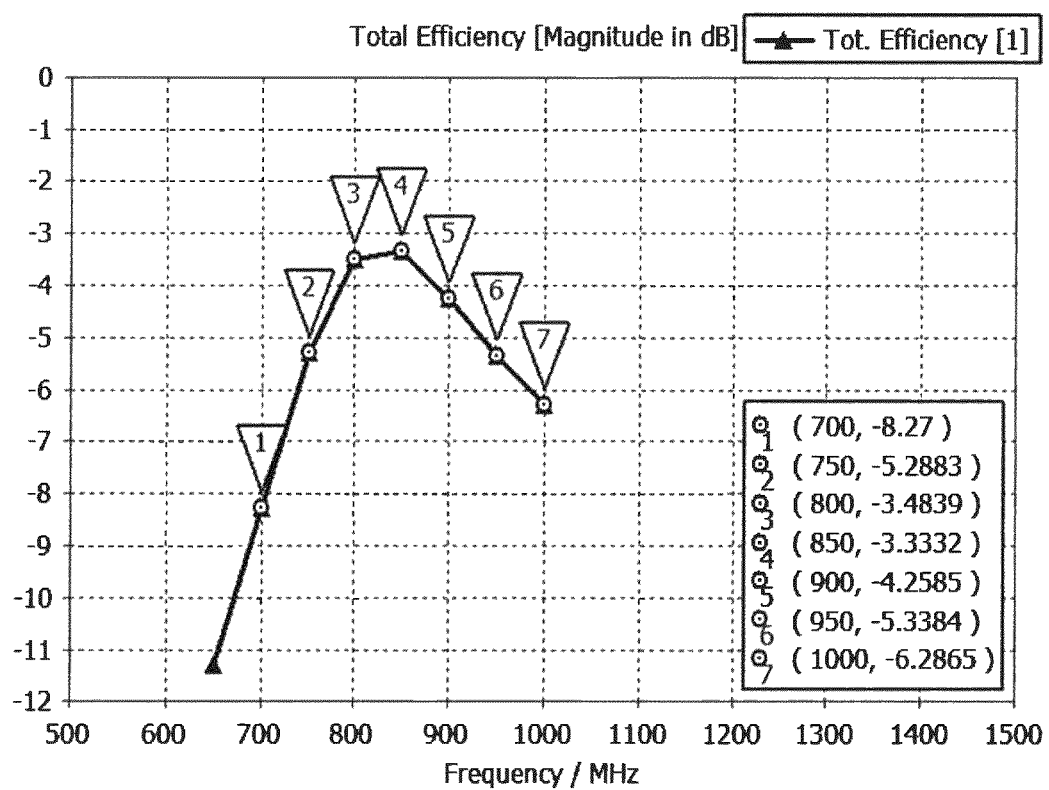
FIG. 8 is a graph illustrating an operation of the first example embodiment.

FIG. 6 illustrates a numerical analysis model of the radio device 100. Dimensions of the present model are set assuming that communication is performed in the vicinity of 800 MHz. FIGS. 7 and 8 illustrate analysis results of the model illustrated in FIG. 6. FIG. 7 illustrates a reflection loss of the antenna 110 that is observed from the power feed unit 102, and FIG. 8 illustrates an antenna efficiency. In this case, the antenna efficiency illustrates a ratio between a total electric power of radio waves radiated from all conductors of the radio device 100, i.e., the conductors of the antenna 110 and the conductor plate 101, and an electric power to be supplied to the power feed unit 102.

A left part of FIG. 10 illustrates a current distribution at 800 MHz in the model of FIG. 6. In FIG. 10, the size of each arrow indicates the magnitude of a current at each location, and the direction of each arrow indicates the direction of a current. The meaning of each arrow is the same as that in the other diagrams illustrating the current distribution. As can be seen from the left part of FIG. 10, arrows indicating a current having a large value are present in the vicinity of an edge of the conductor plate 101.

Figure 9:
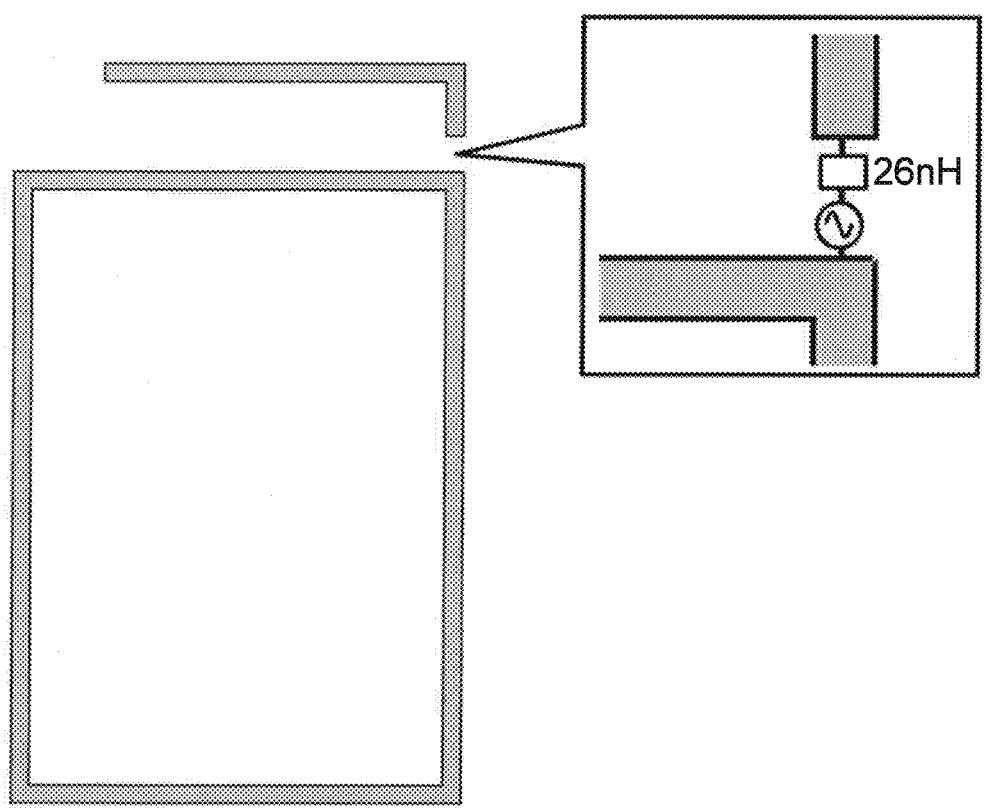
FIG. 9 is a diagram illustrating an operation of the first example embodiment.

Accordingly, it is assumed herein a simple model as illustrated in FIG. 9 in which a central portion of the conductor plate 101 of the radio device 100 illustrated in FIG. 6 is removed and the conductor plate 101 is replaced by a frame-like conductor. When an analysis is enabled using such a simple model, a distribution of a high-frequency current (hereinafter referred to as a current) can be separated into only two directions, i.e., the longitudinal direction and the horizontal direction in the figure, which facilitates the understanding of the operation.

A right part of FIG. 10 illustrates a current distribution at 800 MHz in the simple model of FIG. 9. The direction of each arrow indicating a current having a large value in the right part of FIG. 10 tends to be similar to that in the left part of FIG. 10.

Next, the high-frequency characteristic of the model of FIG. 6 is compared with the high-frequency characteristic of the simple model of FIG. 9. In the model illustrated in FIG. 9, FIG. 11 illustrates a reflection loss of the antenna 110 that is observed from the power feed unit 102, and FIG. 12 illustrates an antenna efficiency.

Figure 11:
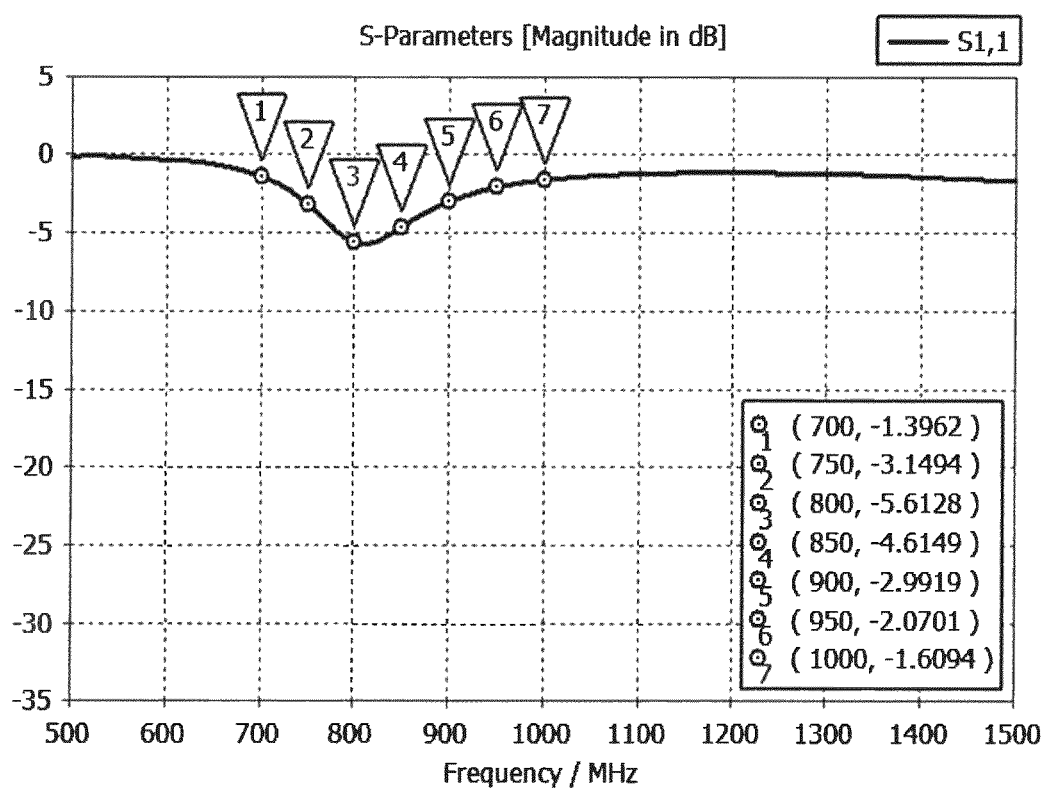
FIG. 11 is a graph illustrating an operation of the first example embodiment.

The resonance frequency as seen from the figure illustrating the reflection loss is about 820 MHz in FIG. 7, which illustrates the reflection loss of the model of FIG. 6, is substantially the same as the resonance of about 810 MHz in FIG. 11 illustrating the reflection loss in the simple model of FIG. 9, and each of the resonances is a single resonance. The value of the reflection loss at the resonance frequency is about 5 dB in FIG. 7 and about 6 dB in FIG. 11, which are close values.

Figure 12:
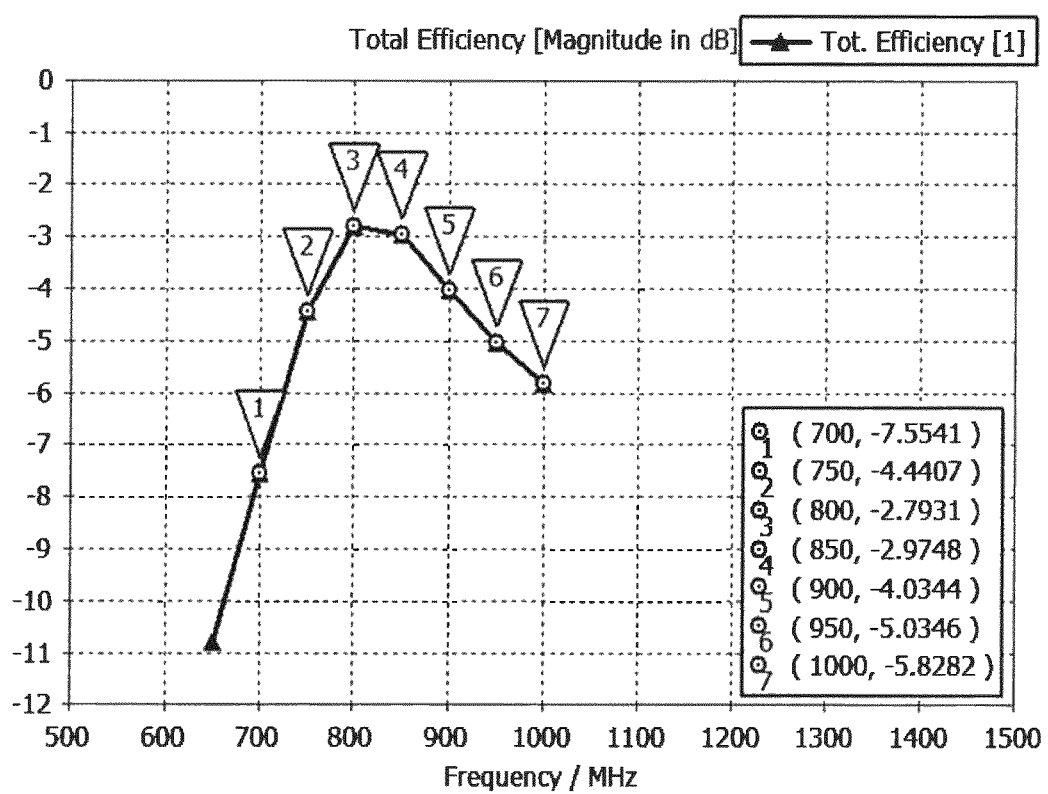
FIG. 12 is a graph illustrating an operation of the first example embodiment.

In FIG. 8 illustrating the antenna efficiency in the model of FIG. 6, the value of a frequency having a maximum antenna efficiency is between 800 MHz and 850 MHz, and the value of a frequency having a maximum antenna efficiency in FIG. 12 illustrating the antenna efficiency in the simple model of FIG. 9 is between 800 MHz and 850 MHz, and thus these values are substantially the same. Further, the value indicating the efficiency at the frequency having the maximum antenna efficiency is about −3.2 dB in FIG. 8 and about −2.7 dB in FIG. 12, and thus these values are close values.

Thus, it has been confirmed that the tendency of the current distribution and high-frequency characteristics in the model of FIG. 6 are similar to those of the simple model of FIG. 9 to be replaced. Accordingly, the simple model of FIG. 9 is used as the model of the radio device 100 in the following description of an antenna radiation mechanism of the radio device 100.

Figure 13:
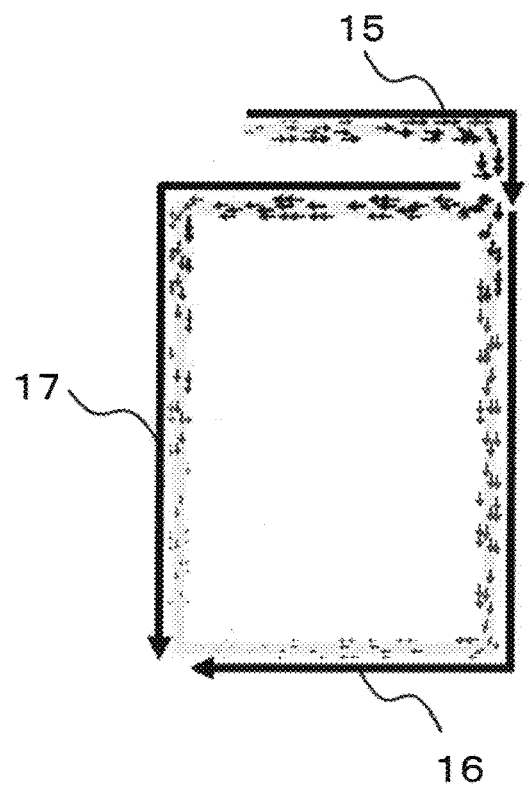
FIG. 13 is a diagram illustrating an operation of the first example embodiment.

In FIG. 13, the position of a current at the time of resonance indicated by connecting small arrows obtained through a current distribution calculation (the right part of FIG. 10) at 800 MHz in the model of FIG. 9 is indicated by a linear part of a large arrow, and the direction of a current at a certain time is indicated by the direction of a large arrow. Note that, for ease of understanding, each large arrow is illustrated at a position slightly shifted from a position of a small arrow, and the illustration is similar to that in the other figures.

In FIG. 13, a current 15 indicates a current flowing through the antenna 110, and currents 16 and 17 each indicate a current flowing through the conductor plate 101. As judged from the current illustrated in FIG. 13, at 800 MHz, the conductor plate 101 can be considered a linear conductor that is branched into two parts, as in an equivalent conductor 18 illustrated in FIG. 14. Note that the equivalent conductor refers to a conductor when a structure of an analysis model may be considered to be composed of a virtual linear conductor as judged from the analysis result. Further, the position of the line of the equivalent conductor is illustrated at a position shifted from the position of the structure to facilitate visualization, and the illustration is similar to that in the other figures.

While a physical length is shortened at one side of the power feed unit 102, an electrical length is considered to be in a state where the antenna 110 having a length that is about ¼ of the wavelength and the equivalent conductor 18 is connected to the opposite side of the power feed unit 102. In this case, when the linear conductor of the equivalent conductor 18 is a linear conductor having a length that is about ¼ of the wavelength, the linear conductor operates as a normal dipole antenna.

Figure 14:
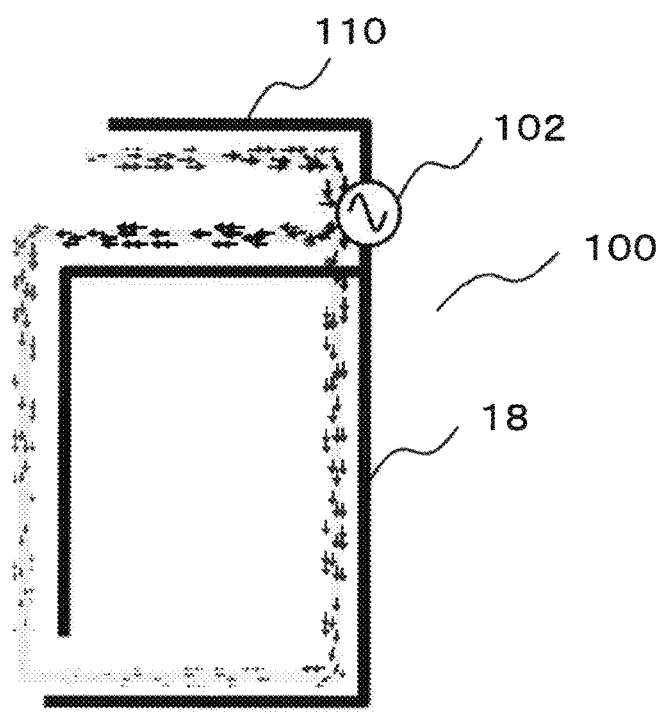
FIG. 14 is a diagram illustrating an operation of the first example embodiment.

However, the equivalent conductor 18 illustrated in FIG. 14 has a configuration in which two linear conductors are connected in parallel. Two linear conductors of the equivalent conductor 18 have a current distribution in which the current is maximum in the power feed unit 102 and is substantially zero at the opposite end of the linear conductor, and thus the length of each of the two linear conductors is about ¼ of the wavelength. In other words, the equivalent conductor 18 has a configuration in which two linear elements having a length that is about ¼ of the wavelength are connected in parallel in the power feed unit 102.

Here, the impedance to be observed by the power feed unit is separately calculated in the configuration in which one ¼ wavelength element is connected to one end of the power feed unit and two ¼ wavelength elements are connected in parallel to the opposite end of the power feed unit. It has been confirmed that the impedance in this configuration has a value that is about ½ of the impedance of a normal dipole antenna in which each ¼ wavelength element is connected symmetrically to the power feed unit. Accordingly, the impedance in the power feed unit 102 of the radio device 100 illustrated in FIG. 14 has a value that is about half the impedance of a normal dipole antenna.

In general, the impedance of a normal dipole antenna matches the impedance of a radio circuit or the like to be connected to the power feed unit in the power feed unit. However, as described above, since the impedance of the antenna of the radio device 100 has a value that is about half the impedance of a normal dipole antenna, it is more difficult to achieve impedance matching in the power feed unit 102 than in a normal dipole antenna. As a result, the radio device 100 has a large reflection in the power feed unit 102, which causes a reduction in reflection loss.

However, as is obvious from the above description, when a current distribution in which the equivalent conductor 18 is equivalent to one linear element is achieved, the high-frequency characteristics of the radio device 100 are further improved.

The radiation mechanism of the radio device 100 has been described above.

Accordingly, in the high-frequency characteristics of the radio device 100 alone when the radio device 100 is not placed on the cradle 200, the reflection loss in the vicinity of 800 MHz where the characteristics are most excellent was about 5 dB and the antenna efficiency was about −3.2 dB as illustrated in FIGS. 7 and 8. On the other hand, in the high-frequency characteristics of the radio device 100 when the radio device 100 is placed on the cradle 200 and connected thereto to operate as the radio device 10 connected to the cradle 200, the reflection loss in the vicinity of 800 MHz where the characteristics are most excellent was about −12 dB and the antenna efficiency was about −1 dB as illustrated in FIGS. 4 and 5. Thus, when the radio device 100 is placed on the cradle 200 and connected thereto to operate as the radio device 10, the high-frequency characteristics are drastically improved as compared with those in the operation of the radio device 100 alone.

A mechanism for improving the high-frequency characteristics of the radio device 10 as compared with the high-frequency characteristics of the radio device 100 alone will be described below.

Figure 15:
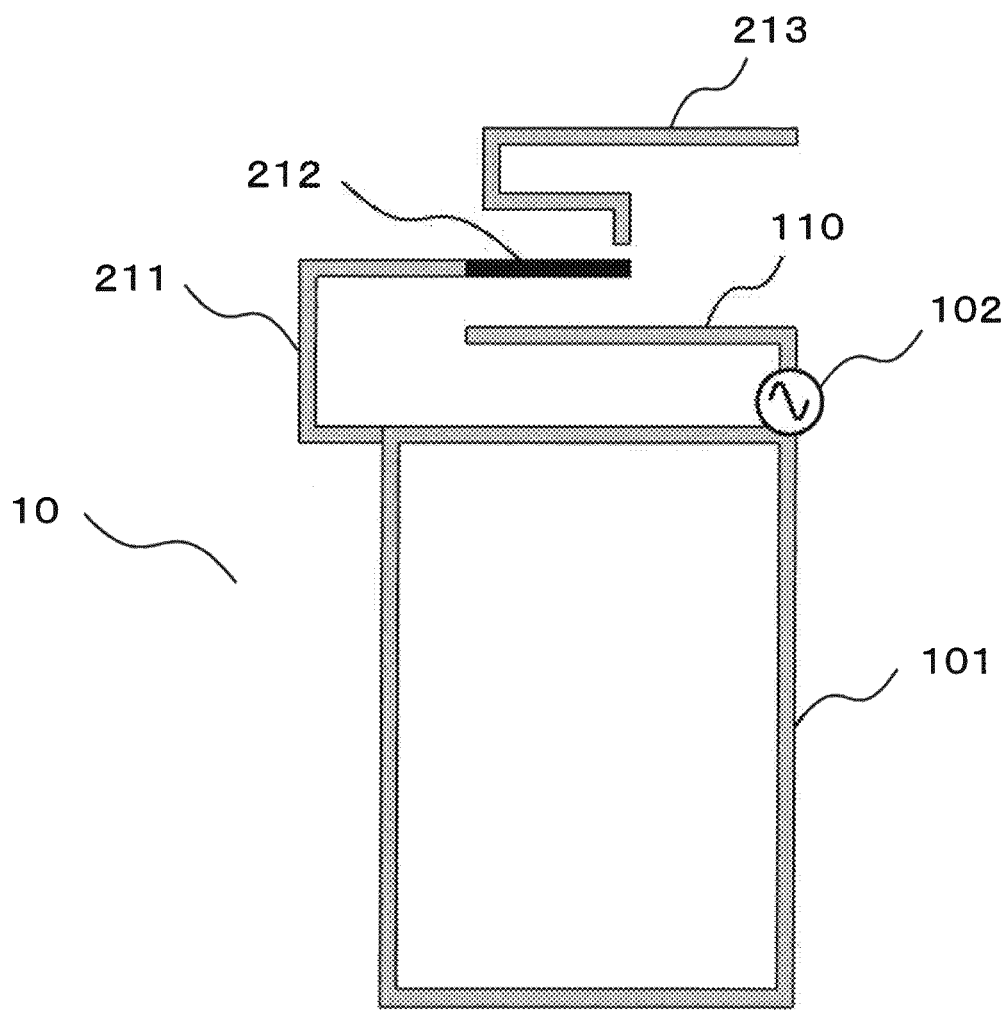
FIG. 15 is a diagram illustrating an operation of the first example embodiment.
Figure 16:
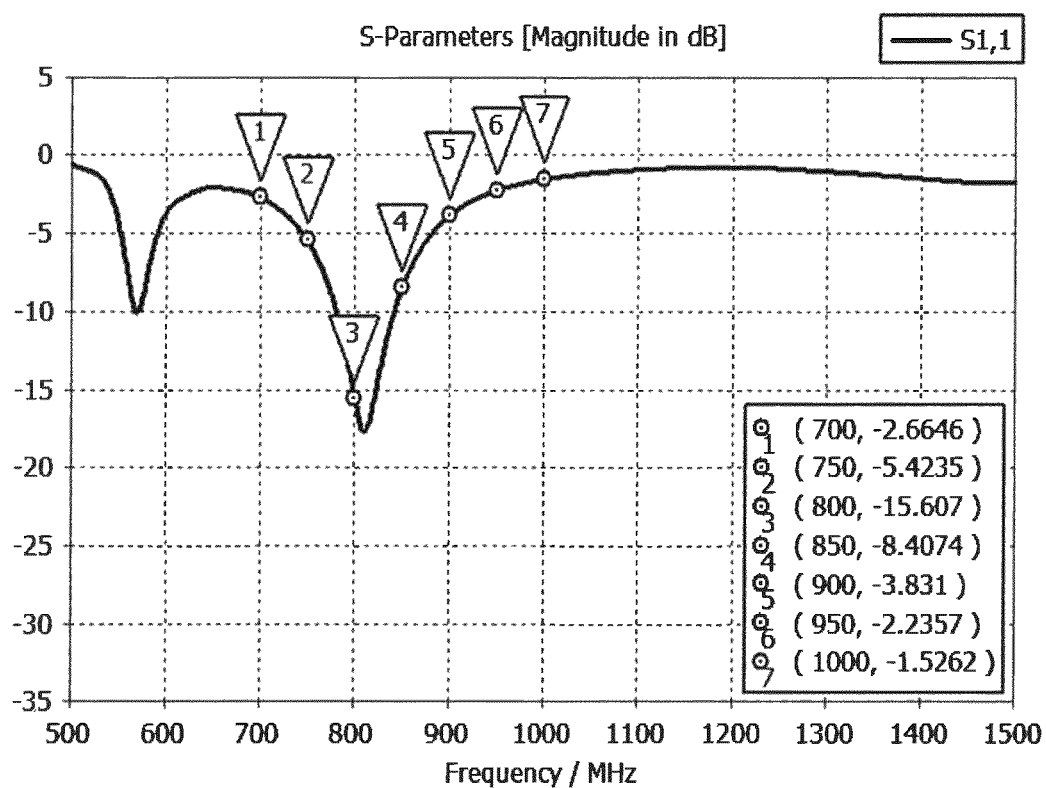
FIG. 16 is a graph illustrating an operation of the first example embodiment.
Figure 17:
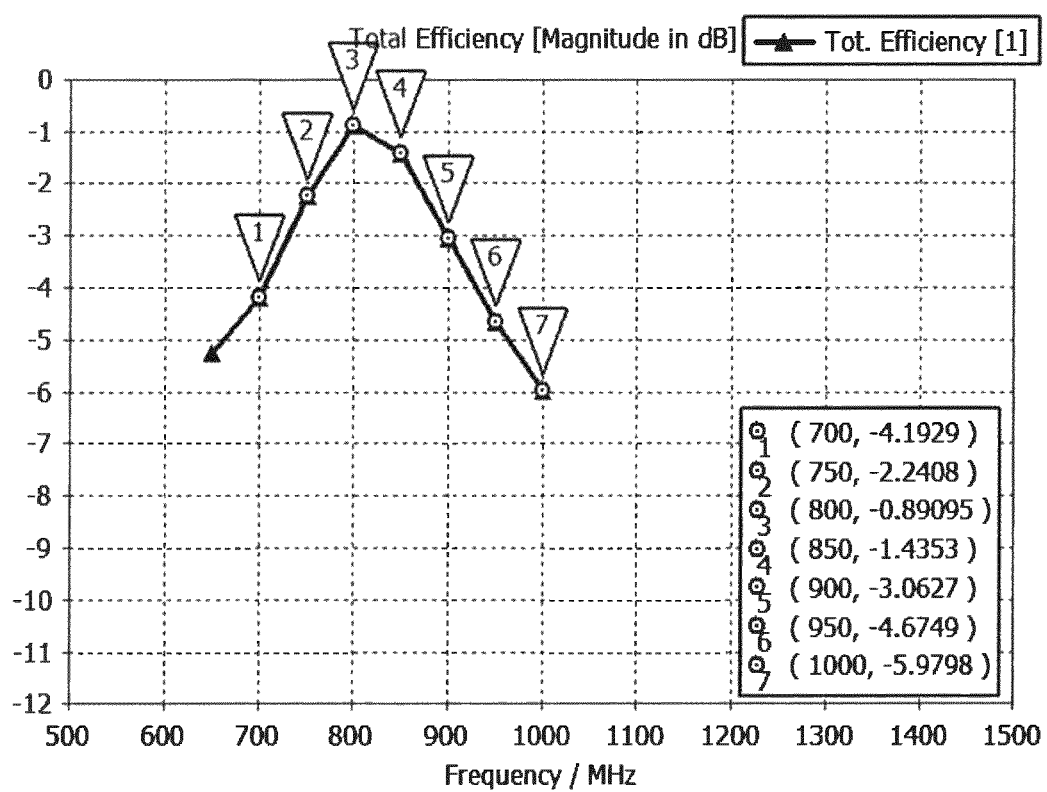
FIG. 17 is a diagram illustrating an operation of the first example embodiment.

The model illustrated in FIG. 15 is a simple model in which the conductor plate 101 in the model of the radio device 10 illustrated in FIG. 3 described above is replaced by a frame-like conductor. FIGS. 16 and 17 illustrate the high-frequency characteristics of the simple model of FIG. 15. FIG. 16 illustrates a reflection loss of the antenna 110, and FIG. 17 illustrates an antenna efficiency.

The resonance frequency judged from the figure illustrating the reflection loss is about 580 MHz and about 820 MHz in FIG. 4 illustrating the reflection loss in the model of FIG. 3 and is about 570 MHz and about 810 MHz in FIG. 16 illustrating the reflection loss of the simple model of FIG. 15, and thus these resonance frequencies are substantially the same and are two resonances. It seems that the value of the reflection loss at the resonance frequency in the vicinity of 800 MHz is about 12 dB in FIG. 4 and is about 18 dB in FIG. 16, which are different values. However, passage losses obtained by a calculation based on the reflection loss are about 0.3 dB and about 0.1 dB, which are sufficiently small values, and a difference between the values is small in error level when the values are measured. Accordingly, it can be said that these values indicate essentially similar characteristics.

In FIG. 5 illustrating the antenna efficiency of the model of FIG. 3, the value of a frequency having a maximum antenna efficiency is in a range from 800 MHz to 850 MHz. In FIG. 17 illustrating the antenna efficiency in the simple model of FIG. 15, the value of a frequency having a maximum antenna efficiency is in a range from 800 MHz to 850 MHz, and thus these values are substantially identical. Further, the value of the efficiency at the frequency having the maximum antenna efficiency is about −1.0 dB in FIG. 5 and about −0.9 dB in FIG. 17, which are close values.

Thus, it has been confirmed that the tendency of the current distribution and high-frequency characteristics in the model of the radio device 10 of FIG. 3 are similar to those of the simple model of FIG. 15 to be replaced. Accordingly, the simple model of FIG. 15 is used as the model of the radio device 10 in the following description of an antenna radiation mechanism of the radio device 10.

Figure 18:
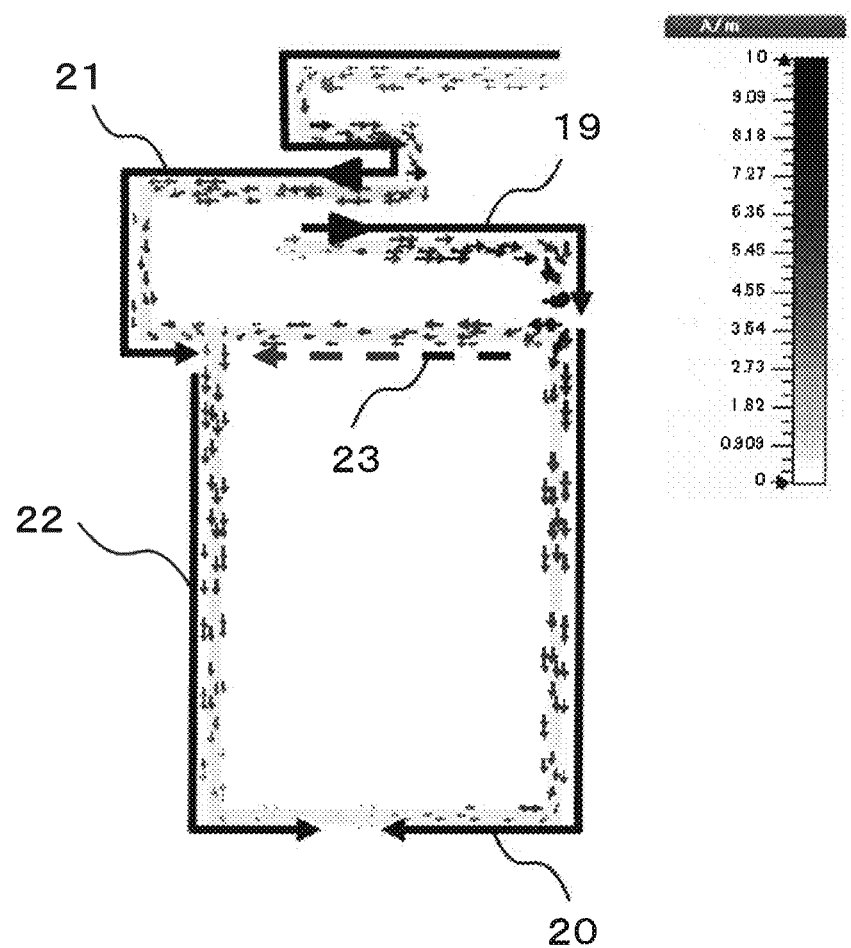
FIG. 18 is a diagram illustrating an operation of the first example embodiment.

FIG. 18 illustrates a current distribution in the model of FIG. 15. In FIG. 18, the position of a standing wave and the direction of a current which are assumed from the current distribution are indicated by long arrows.

FIG. 18 is understood as follows. The antenna 110 is excited by the power feed unit 102 and currents 19 and 20 are generated. The directions of the arrows are aligned (not opposite directions), and thus the currents 19 and 20 are considered a series of current.

On the other hand, currents 21 and 22 having a phase opposite to that of the current 19 is induced by space coupling with the element 212 located in parallel to the antenna 110. The directions of the arrows indicating the currents 21 and 22 are aligned, and thus the currents 21 and 22 are considered a series of current.

The magnitude of the current 23 is smaller than that of the current at the same position in FIG. 14. Accordingly, FIG. 19 illustrates an equivalent conductor assuming that a series current of the currents 19 and 20 and a series of current of the currents 21 and 22 are main currents flowing through the radio device 10.

As described above, the equivalent conductor 18 of the radio device 100 illustrated in FIG. 14 has a configuration in which not one linear conductor but instead two linear conductors are connected in parallel, which has an adverse effect on the reflection loss in the radio device 100. However, in the equivalent conductor of the radio device 10 illustrated in FIG. 19, the element connected to the lower side of the power feed unit 102 is considered to operate similarly to one linear conductor, instead of the linear conductor branched into two parts as in the equivalent conductor 18 illustrated in FIG. 14.

Figure 19:
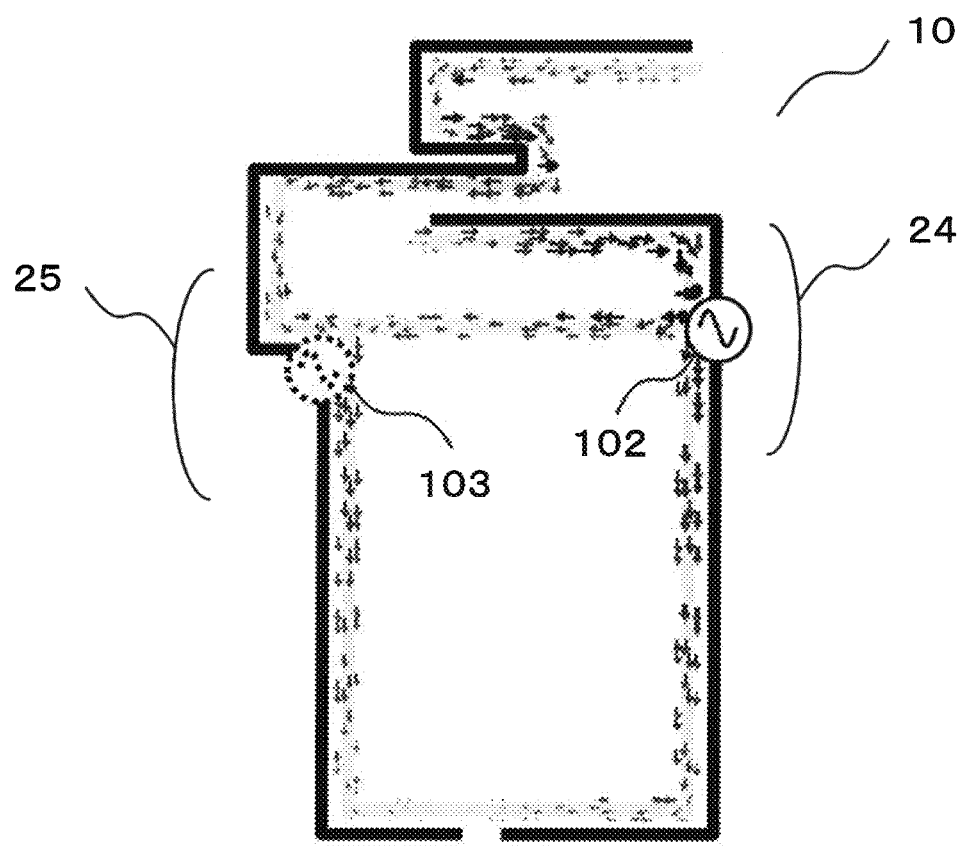
FIG. 19 is a diagram illustrating an operation of the first example embodiment.

Accordingly, the impedance obtained by observing the antenna from the power feed unit 102 of the radio device 10 illustrated in FIG. 19 becomes higher than the impedance obtained by observing the antenna from the power feed unit 102 of the radio device 100 illustrated in FIG. 14, and is closer to the impedance of a normal dipole antenna. As a result, the reflection loss in the radio device 10 is improved as compared with the reflection loss in the radio device 100.

In FIG. 18, the position where the current is relatively small in a series of current of the currents 21 and 22 is a position corresponding to the terminal 103 illustrated in FIG. 19. Accordingly, it is considered that the terminal 103 illustrated in FIG. 19 operates similarly to a virtual dipole antenna 25 in which two elements are separated and no power is fed.

As can be seen from FIG. 19, the current flowing through the virtual dipole antenna 24 and the virtual dipole antenna 25 flows from the top to the bottom in each figure, and thus the both virtual dipole antennas operate at the same phase. Further, since both the virtual dipole antennas operate at the same phase, the electromagnetic fields radiated from the radio device 10 strengthen each other. The virtual dipole antennas operating at the same phase are not present in the radio device 100, and thus the antenna efficiency in the radio device 10 is improved as compared with the antenna efficiency in the radio device 100.

Thus, the reflection loss and antenna efficiency in the radio device 10 are improved as compared with those in the radio device 100.

Next, the length of the antenna 210 will be described.

Herein, to facilitate understanding, as illustrated in FIG. 1, the element 213 of the antenna 210 is described as a linear element that is not bent.

Figure 24:
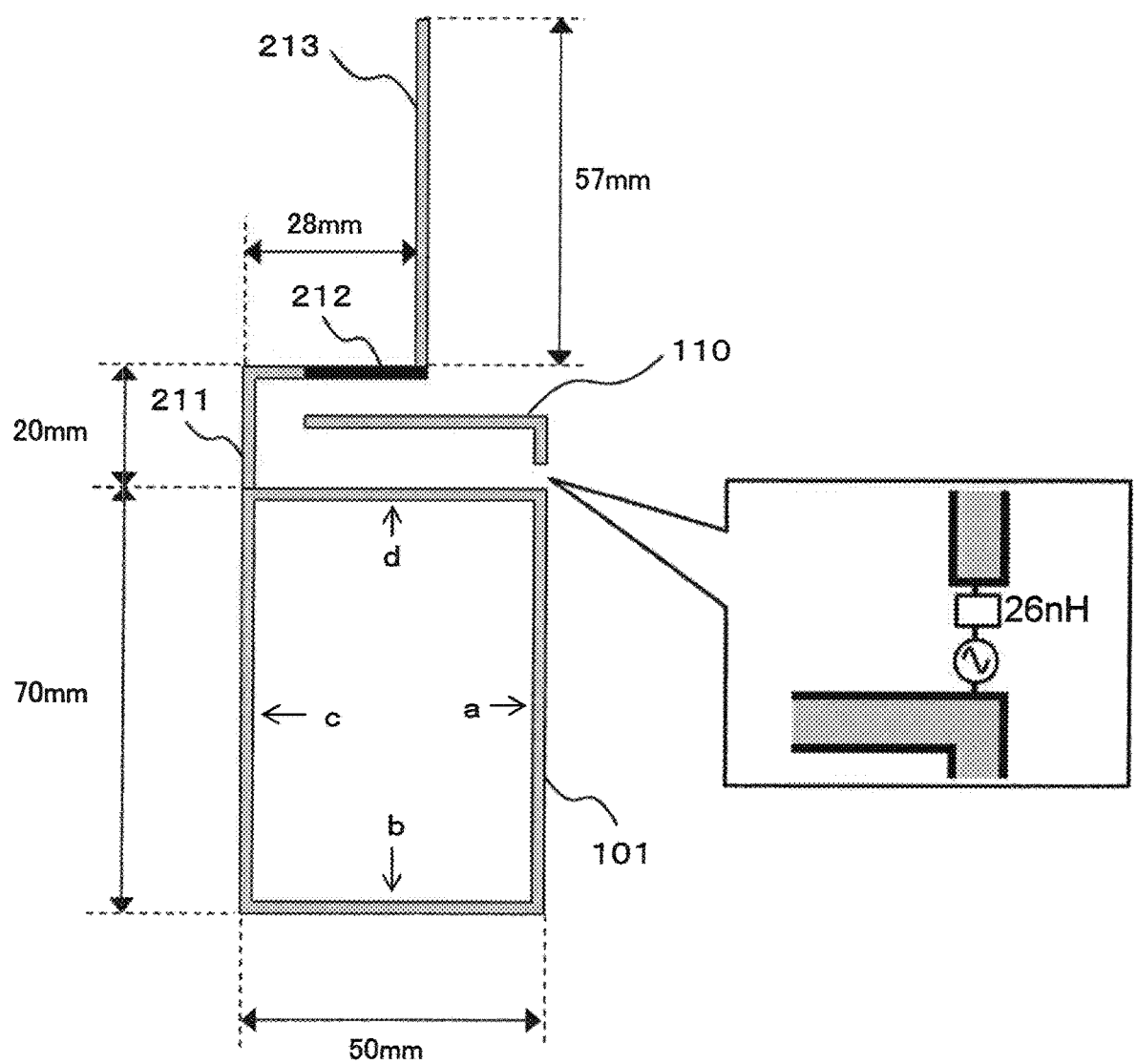
FIG. 24 is a diagram illustrating an operation of the first example embodiment.
Figure 25:
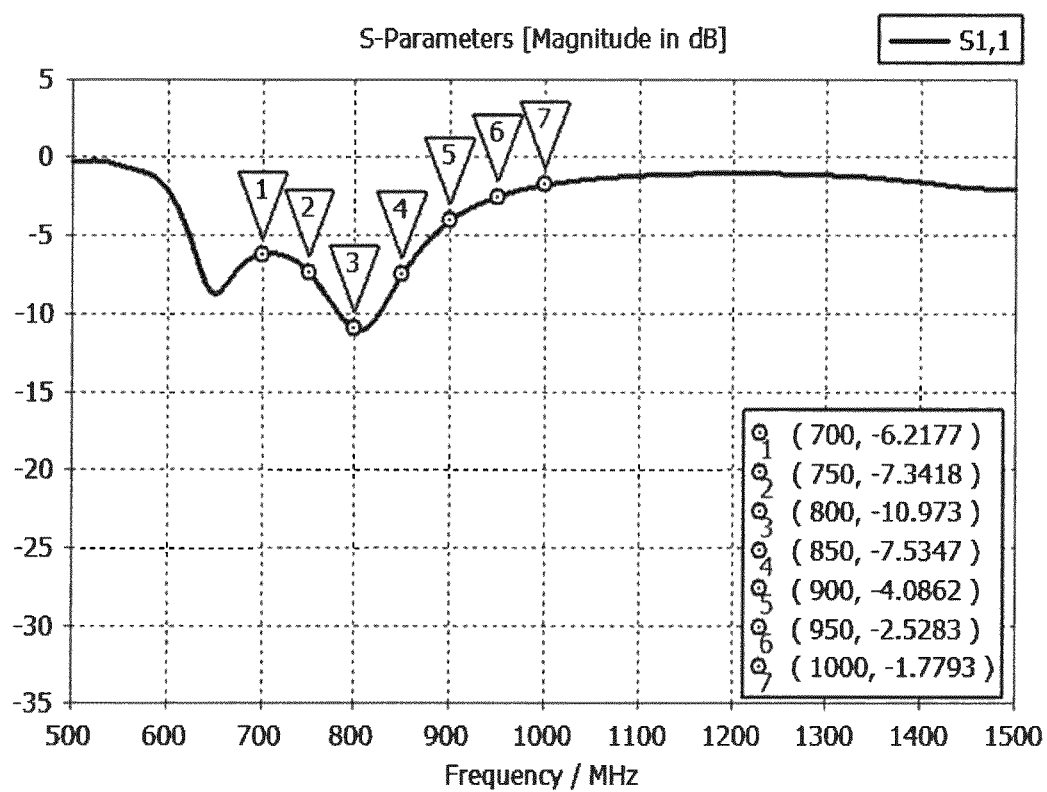
FIG. 25 is a graph illustrating an operation of the first example embodiment.

FIG. 24 illustrates specific dimensions of each component of the radio device 10. The model illustrated in FIG. 24 is designed with a resonance frequency of 800 MHz. FIG. 25 illustrates the reflection loss in the model.

Figure 26:
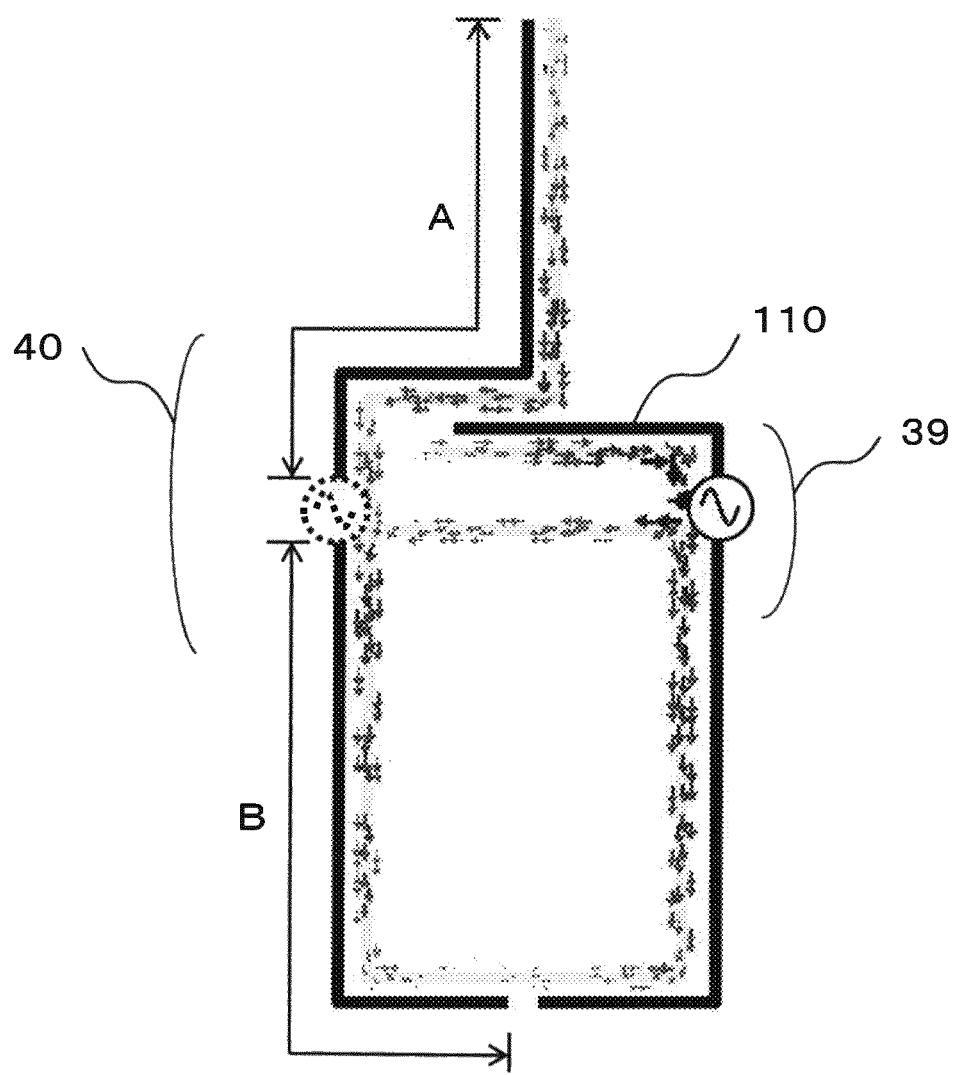
FIG. 26 is a diagram illustrating an operation of the first example embodiment.

FIG. 26 illustrates a current distribution in the model of the radio device 10 illustrated in FIG. 24. A thick solid line illustrated in FIG. 26 represents an equivalent conductor estimated from the current distribution. Similarly to the virtual dipole antenna 24 and the virtual dipole antenna 25 illustrated in FIG. 19 described above, it can be understood that the radio device 10 operates as if a virtual dipole antenna 39 of a power feed unit side and a virtual dipole antenna 40 of a non-power-feed side are present.

The length of two antennas will be described with reference to FIG. 26.

The antenna 110, which is one element of the power-feed-side virtual dipole antenna 39, has a length of 50 mm (the same length as that of the antenna 110 illustrated in FIG. 3) which is shorter than the length of about 95 (mm) that is ¼ of the wavelength corresponding to 800 MHz, for mounting or the like. A virtual element on the conductor plate side of the virtual dipole antenna 39 resonates at a length of about 95 (mm) that is ¼ of the wavelength corresponding to 800 MHz. Accordingly, the entire length of the virtual dipole antenna 39 is shorter than about 190 mm, which is half the wavelength corresponding to the resonance frequency of 800 MHz, by about 45 mm.

On the other hand, the entire length of the non-power-feed-side virtual dipole antenna 40 resonates at a length of about 190 (mm) that is half the wavelength corresponding to 800 MHz, as in a normal dipole antenna. Accordingly, Expression 1 can be expressed assuming that the length of the antenna 210 (the total length of the element 211, the element 212, and the element 213) is represented by A and the length of the virtual element on the conductor plate side is represented by B. Herein, R represents the wavelength corresponding to the resonance frequency (800 MHz in this case).

$$A+B=R/2 \quad \text{(Expression 1)}$$

In the formula, the lengths of a side "a", a side "b", and a side "c" of the conductor plate illustrated in FIG. 24 are respectively represented by La, Lb, and Lc. Then, B can also be represented by a length obtained by subtracting the length of the virtual element on the conductor plate of the power-feed-side virtual dipole antenna from (La+Lb+Lc). Further, as described above, since the length of the virtual element on the conductor plate of the power-feed-side virtual dipole antenna is R/4, B has a relationship as expressed by Expression 2.

$$B=(La+Lb+Lc)-R/4 \quad \text{(Expression 2)}$$

Further, Expression 1 is transformed to obtain the following expression.

$$A=R/2-B$$

Expression 2 is substituted into this expression to obtain Expression 3.

$$A=R/2-(La+Lb+Lc-R/4) \quad \text{(Expression 3)}$$

Further, Expression 3 is organized to obtain Expression 4.

$$A=3R/4-(La+Lb+Lc) \quad \text{(Expression 4)}$$

Values of La, Lb, and Lc illustrated in the model of FIG. 24 are substituted into Expression 4 to obtain the length A of the antenna 210, thereby obtaining the following value.

$$A=281-(70+50+70)=91 \text{ (mm)} \quad \text{(Expression 5)}$$

On the other hand, the dimensions of the antenna 210 illustrated in FIG. 24 are optimized by performing an electromagnetic field numerical analysis to obtain the resonance frequency of 800 MHz, and the following value is obtained as the length A of the antenna 210.

$$A=57+28+20=105 \text{ (mm)} \quad \text{(Expression 6)}$$

The value in Expression 6 is slightly different from 91 mm obtained in Expression 5. However, it is considered that this difference is caused due to the effect that the antenna 210 is not completely straight, the effect that the antenna 210 is bent at two sections, or the effect that the antenna 210 is close to the antenna 110.

Note that in many of current smartphones or mobile routers having a screen size of about 4 to 5 inches, the value of (La+Lb+Lc) is about half the wavelength corresponding to the frequency of 800 MHz.

Accordingly, (Expression 4) can be expressed by the following expression.

$$A \approx 3R/4-R/2=R/4 \quad \text{(Expression 7)}$$

Accordingly, in current mobile terminals having a screen size of about 4 to 5 inches, the optimum length of the antenna 210 at 800 MHz is about R/4.

As described above, the dimensions of the antenna 210 can be optimized. However, even when the antenna 210 has a length other than that described above, the length has no influence on the essential effects of the present invention.

Referring next to FIG. 25, the presence of a second resonance frequency can be confirmed in the vicinity of 650 MHz which is lower than a first resonance frequency of 800 MHz. Accordingly, the reason that the second resonance frequency is present will be described below.

Figure 27:
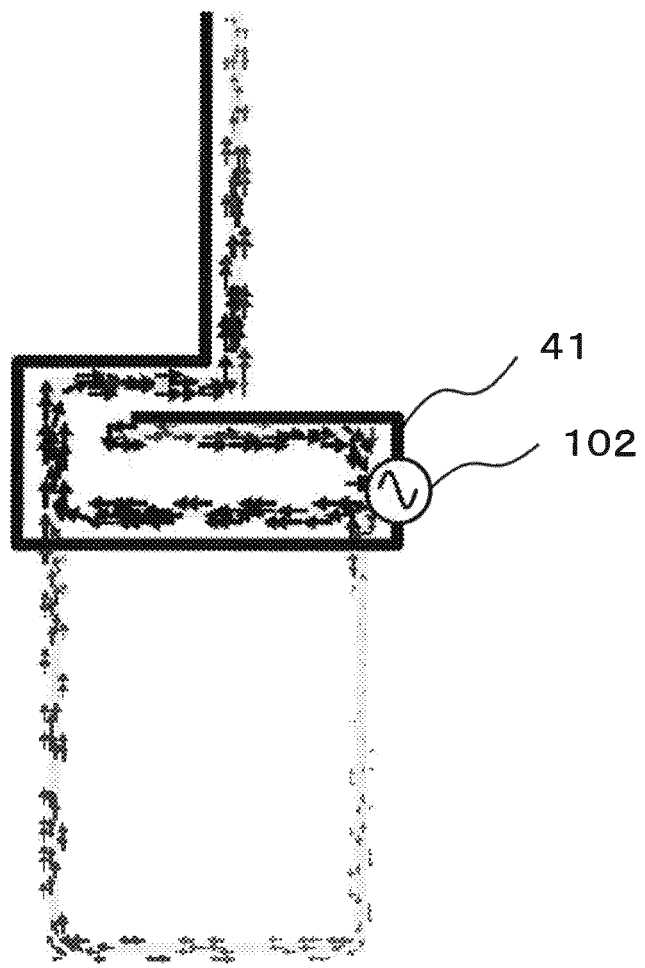
FIG. 27 is a diagram illustrating an operation of the first example embodiment.

First, FIG. 27 illustrates a current distribution at a frequency of 650 MHz and an equivalent conductor estimated from the current distribution. While the structures illustrated in FIGS. 26 and 27 described above are the same, the current distribution at a frequency 800 MHz is different from the current distribution at a frequency 650 MHz. In other words, there are two resonance routes of the frequency of 800 MHz and the frequency of 650 MHz. Accordingly, the equivalent conductor at 800 MHz illustrated in FIG. 26 is different from the equivalent conductor at 650 MHz illustrated in FIG. 27.

The equivalent conductor at the frequency of 650 MHz illustrated in FIG. 27 forms a virtual dipole antenna 41 having elements at both ends of the power feed unit 102. The entire length of the virtual dipole antenna 41 corresponds to the total of the antenna 110, an upper side d (see FIG. 24) of the conductor plate, and the lengths of the element 211, the element 212, and the element 213.

Herein, the length of the antenna 110 is shortened by the inductor 104 of an impedance matching circuit, while the electrical length of antenna 110 corresponds to about R/4 at 800 MHz.

The total of the lengths of the element 211, the element 212, and the element 213, i.e., the length of the antenna 210, is about R/4 at 800 MHz according to the above-described Expression 7 in a mobile terminal having a screen size of about 4 to 5 inches.

In view of the above, the electrical length of the virtual dipole antenna illustrated in FIG. 27 can be expressed as the following expression assuming that the length of the side d is represented by Ld and the wavelength corresponding to 800 MHz is represented by R.

The entire length of a 650 MHz virtual dipole antenna=R/4+Ld+R/4

$$=R/2+Ld \qquad \text{(Expression 8)}$$

In general, when the entire length of the dipole antenna is R/2, i.e., about 190 mm, the resonance frequency is 800 MHz. Referring to Expression 8, one of the elements of the virtual dipole antenna 41 is longer by the length of Ld, and the entire length of the virtual dipole antenna 41 is longer than R/2 at 800 MHz. Therefore, the resonance frequency of the virtual dipole antenna is lower than 800 MHz.

In FIG. 24, the length Ld of d is 50 mm, and thus the entire length of the elements of the virtual dipole antenna 41 is calculated as 190+50=240 (mm) from Expression 8. The frequency corresponding to R/2 of 240 mm is about 630 MHz. This is substantially the same as 650 MHz which is the second resonance frequency observed in FIG. 25.

Next, a space coupling portion illustrated as the element 212 in in FIGS. 2, 3, 15, 20, and 24 will be described.

Figure 28:
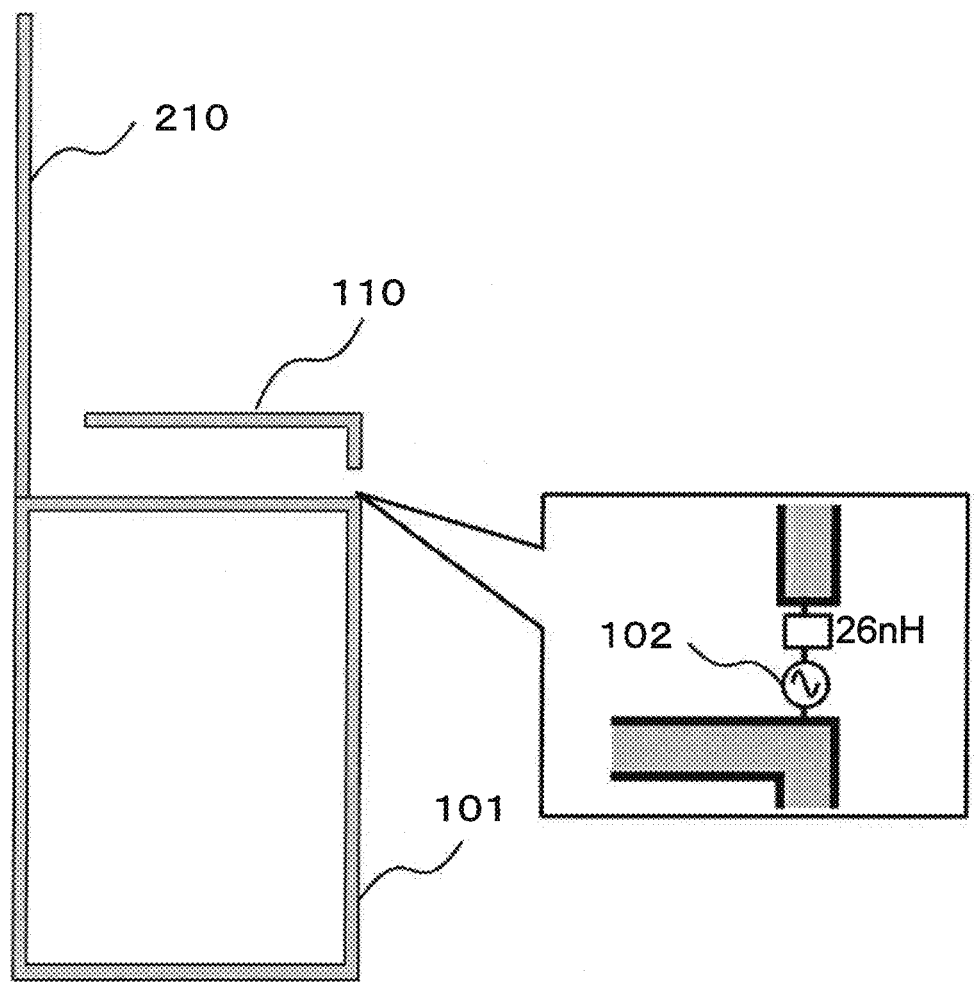
FIG. 28 is a diagram illustrating an operation of the first example embodiment.

A model illustrated in FIG. 28 is a model in which the antenna 210 extends straight upward in the figure and the space coupling portion (corresponding to the element 212) with the antenna 110 is not present.

Figure 29:
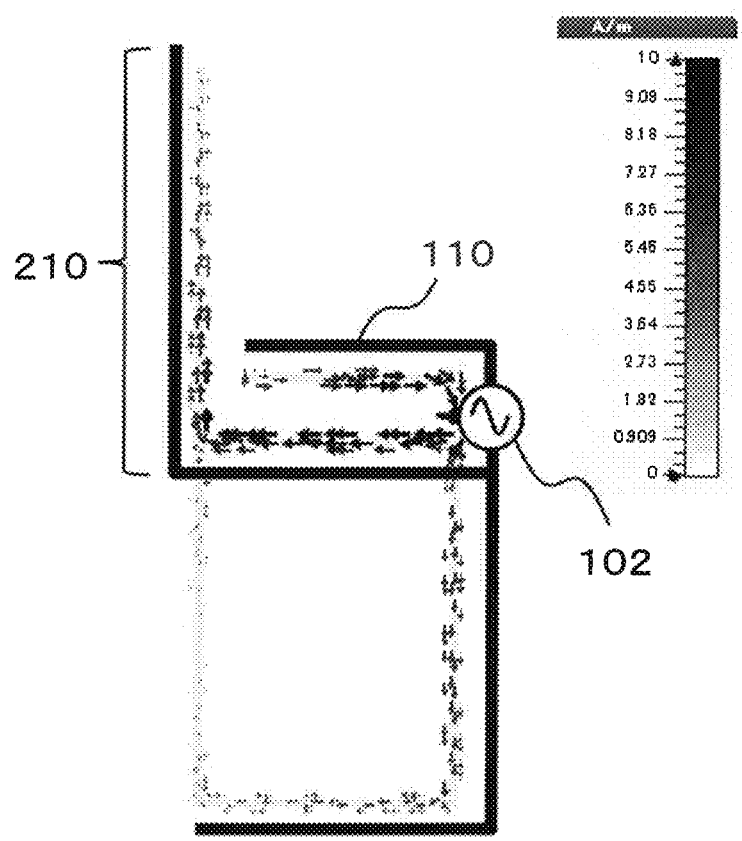
FIG. 29 is a diagram illustrating an operation of the first example embodiment.

As can be seen from the current distribution at 800 MHz illustrated in FIG. 29 and the equivalent conductor estimated from the current distribution, when the space coupling portion is not present, the virtual dipole antenna 39 as illustrated in FIG. 26 and the virtual dipole antenna 40 are not present.

A current flowing downward along the right side of the conductor plate 101 from the power feed unit 102 is present with respect to a current flowing upward along the antenna 210. The radio waves radiated from the currents in opposite directions are cancelled out. As a result, the antenna efficiency of the radio device in the model illustrated in FIG. 28 deteriorates as compared with that of the radio device 100 illustrated in FIGS. 6 and 9.

Next, the arrangement of the inductor 202 in the antenna 210 will be described.

Figure 20:
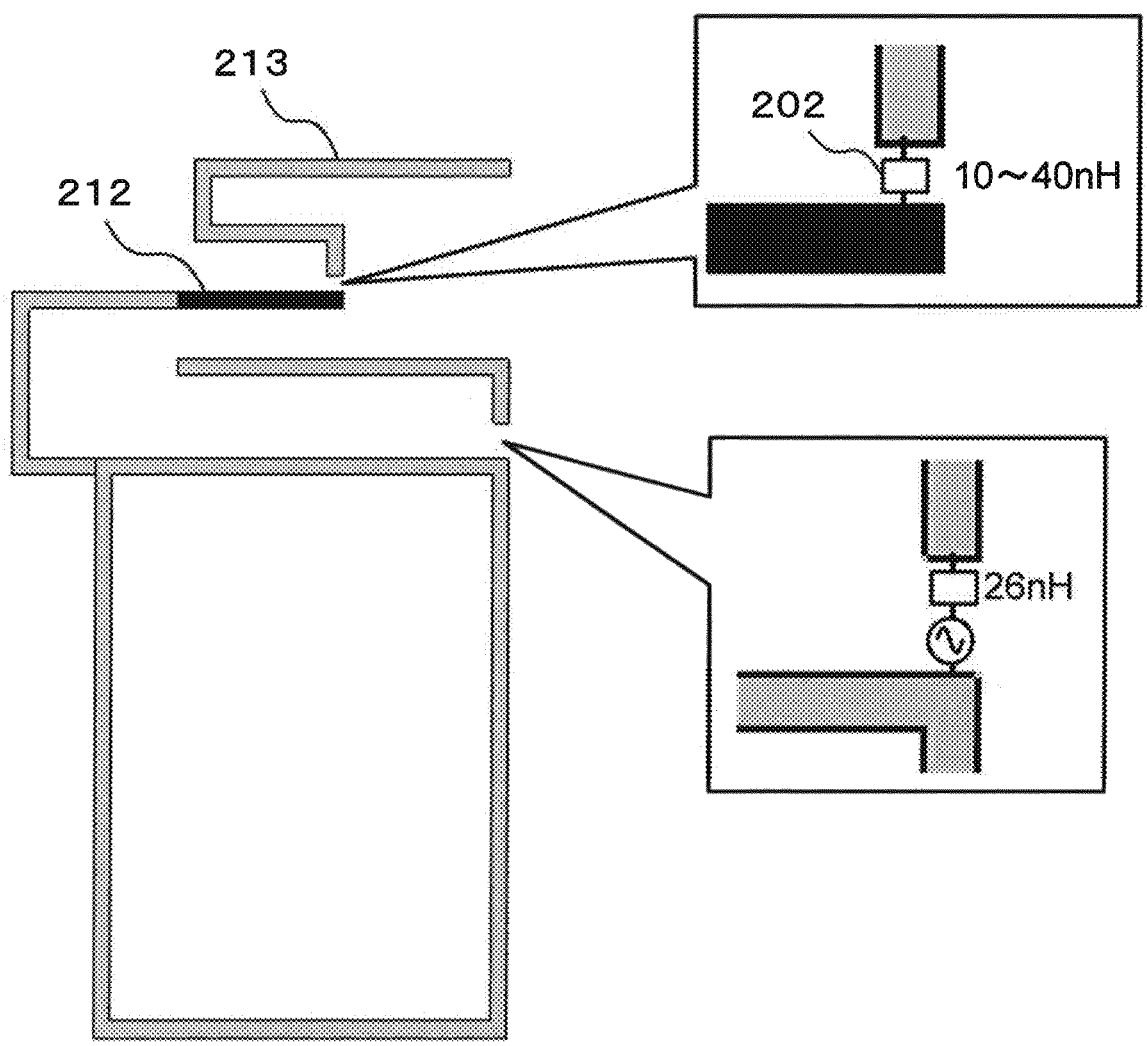
FIG. 20 is a diagram illustrating an operation of the first example embodiment.
Figure 21:
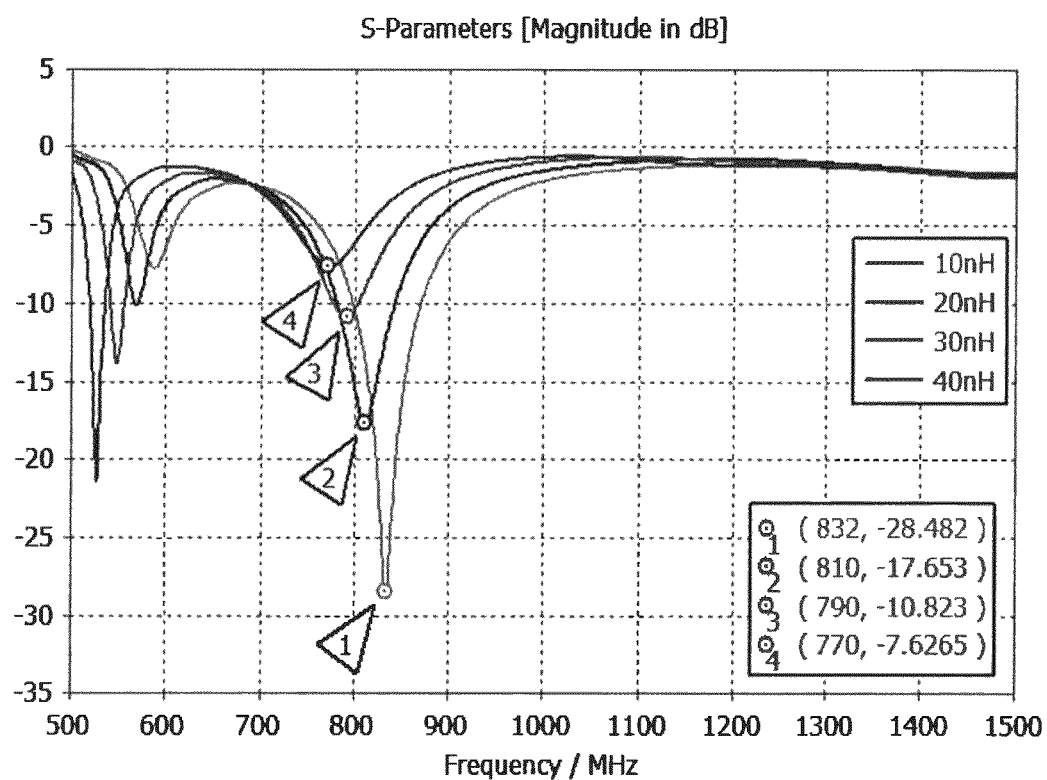
FIG. 21 is a graph illustrating an operation of the first example embodiment.

First, a case where the inductor 202 is disposed between the element 212 and the element 213 will be described with reference to FIG. 20. The inductor 202 is used to correct a deviation in the frequency due to a lack of an antenna element length when the antenna 210 is shortened for mounting or the like. FIG. 21 is a graph illustrating a reflection loss when the value of the inductor 202 is changed. As can be seen from FIG. 21, a resonance point in the vicinity of 800 MHz varies by about 20 MHz every time the value of the inductor varies by 10 nH.

Figure 22:
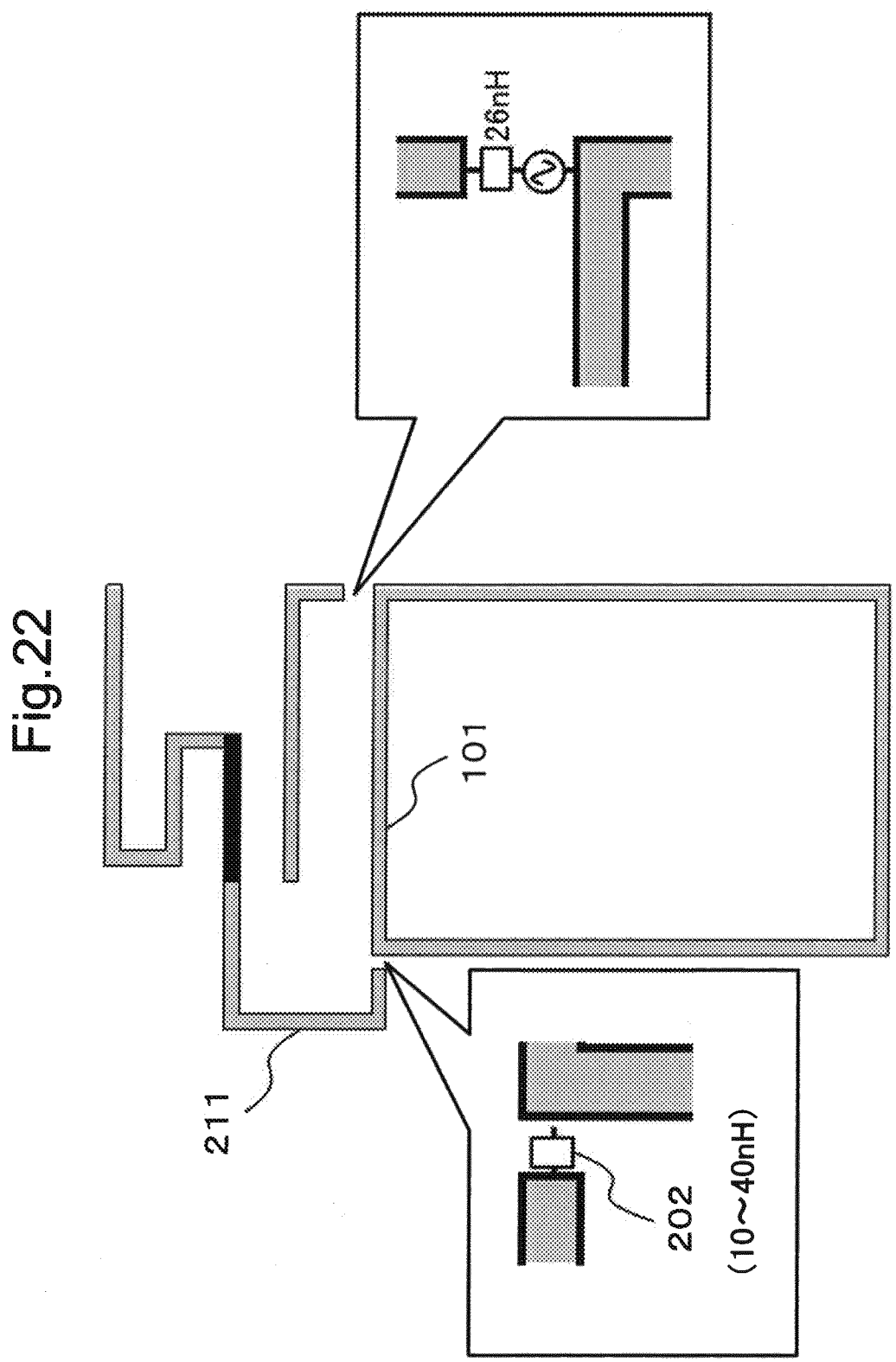
FIG. 22 is a diagram illustrating an operation of the first example embodiment.

Next, a case where the inductor 202 is disposed between the element 211 and the conductor plate 101 as illustrated in FIG. 22 will be described. Note that in FIG. 22, the sizes of the connecting portion 201 and the terminal 103 are negligibly smaller than the sizes of the element 211 and the conductor plate 101, and thus are omitted in the model for calculation. In practice, the inductor 202 is disposed between the element 211 and the connecting portion 201 of the cradle 200 illustrated in FIG. 3, or is disposed between the terminal 103 and the conductor plate 101 of the radio device 100.

Figure 23:
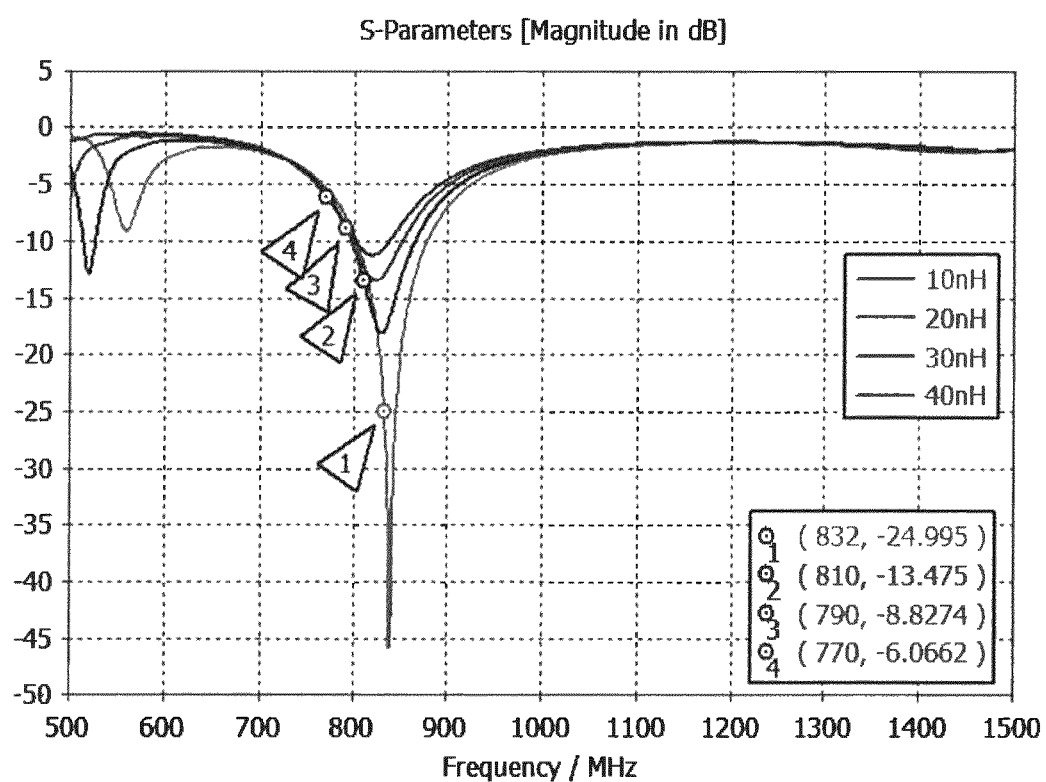
FIG. 23 is a graph illustrating an operation of the first example embodiment.

FIG. 23 is a graph illustrating a reflection loss in the model illustrated in FIG. 22. As can be seen from FIG. 23, a resonance point in the vicinity of 800 MHz varies by about 7 MHz every time the inductor varies by 10 nH. Thus, unlike in the case where the inductor 202 is disposed between the element 212 and the element 213 as illustrated in FIG. 20, when the inductor 202 is disposed between the element 212 and the conductor plate 101 as illustrated in FIG. 22, variations are small.

As described above, to adjust the resonance frequency in the inductor 202, the adjustment is more effective when the inductor 202 is disposed between the element 212 and the element 213 than when the inductor 202 is disposed between the element 212 and the conductor plate 101. However, even when the inductor 202 is disposed between the element 212 and the conductor plate 101, or between the element 212 and the element 213, or at any position of the antenna 210, the inductor 202 has no influence on the essential effects of the present invention.

The operation of the present example embodiment has been described above.

As described above, when the radio device 100 is placed on the cradle 200, the element 211 of the antenna 210 built in the cradle 200 is connected to the conductor plate 101 of the radio device 100. Further, the element 212 to be connected to an end of the element 211 that is not connected to the conductor plate 101 is disposed in parallel to the antenna 110 built in the radio device 100. In addition, the element 213 to be connected to an end of the element 212 that is not connected to the element 211 is disposed in a direction apart from the conductor plate 101.

With this configuration, the element 212 is electromagnetically space coupled with the antenna 110, and a current is induced in the element 212. The current induced in the element 212 flows through the entire antenna 210, thereby enabling the antenna 210 to operate as an external antenna.

Figure 36:
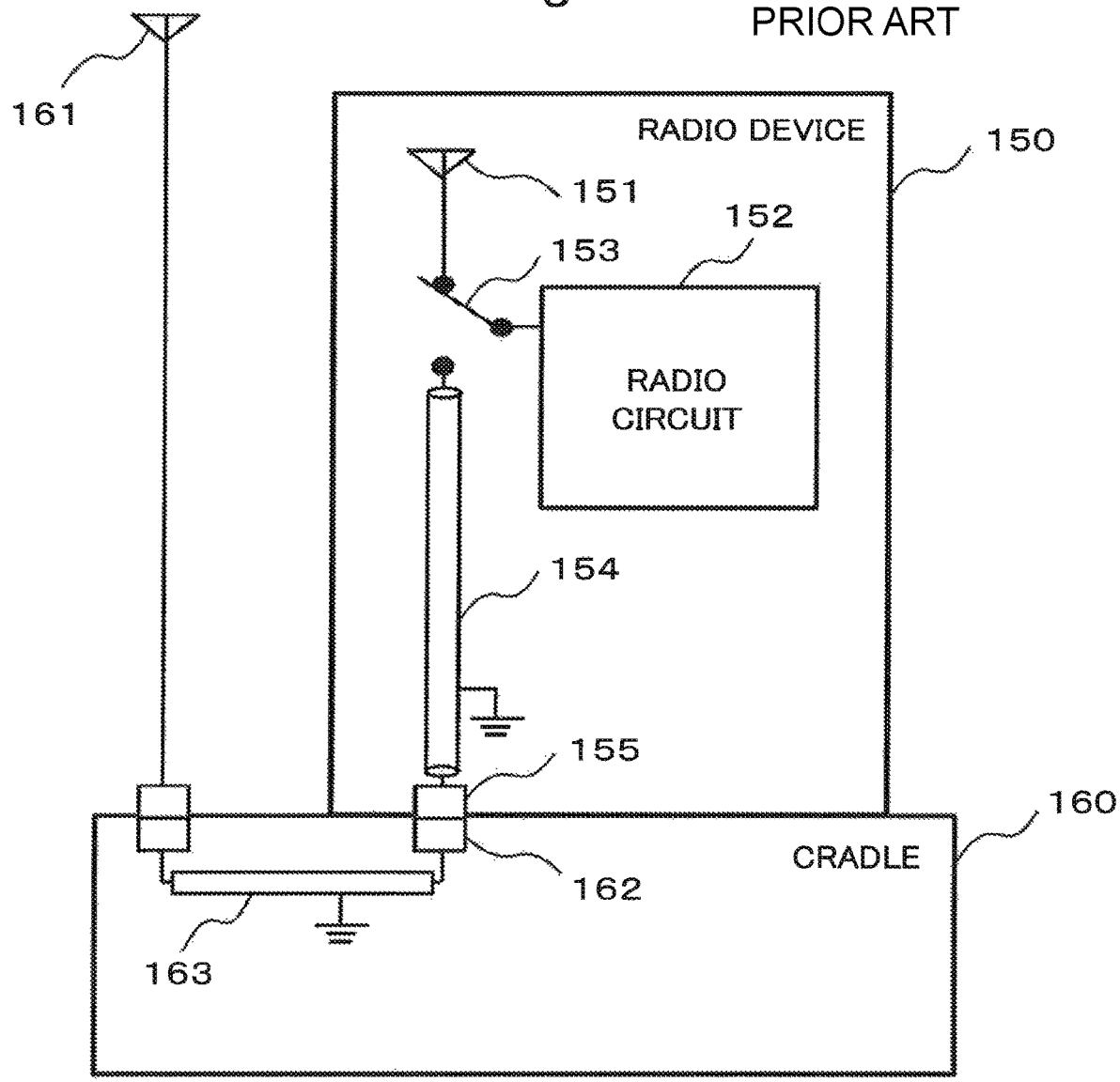
FIG. 36 is a diagram illustrating a configuration example of related art.

In the radio device 150 and the cradle 160 illustrated in FIG. 36 as related art, the components including the switch 153, the transmission line 154, the transmission line 163, the connector 155, and the connector 162 are required to connect the radio device 150 and the external antenna 161 to each other. However, as illustrated in FIGS. 2 and 3, in the radio device 10 according to the present example embodiment, only the terminal 103 and the connecting portion 201 are required as components to connect the radio device 100 to the antenna 210.

Thus, in the radio device 10 according to the present example embodiment, the external antenna of the radio device 100 can be implemented with a simple configuration using a small number of components than that in the configuration of related art illustrated in FIG. 36.

Second Example Embodiment

Next, a second example embodiment will be described in detail with reference to the drawings.

[Description of Configuration]

Figure 30:
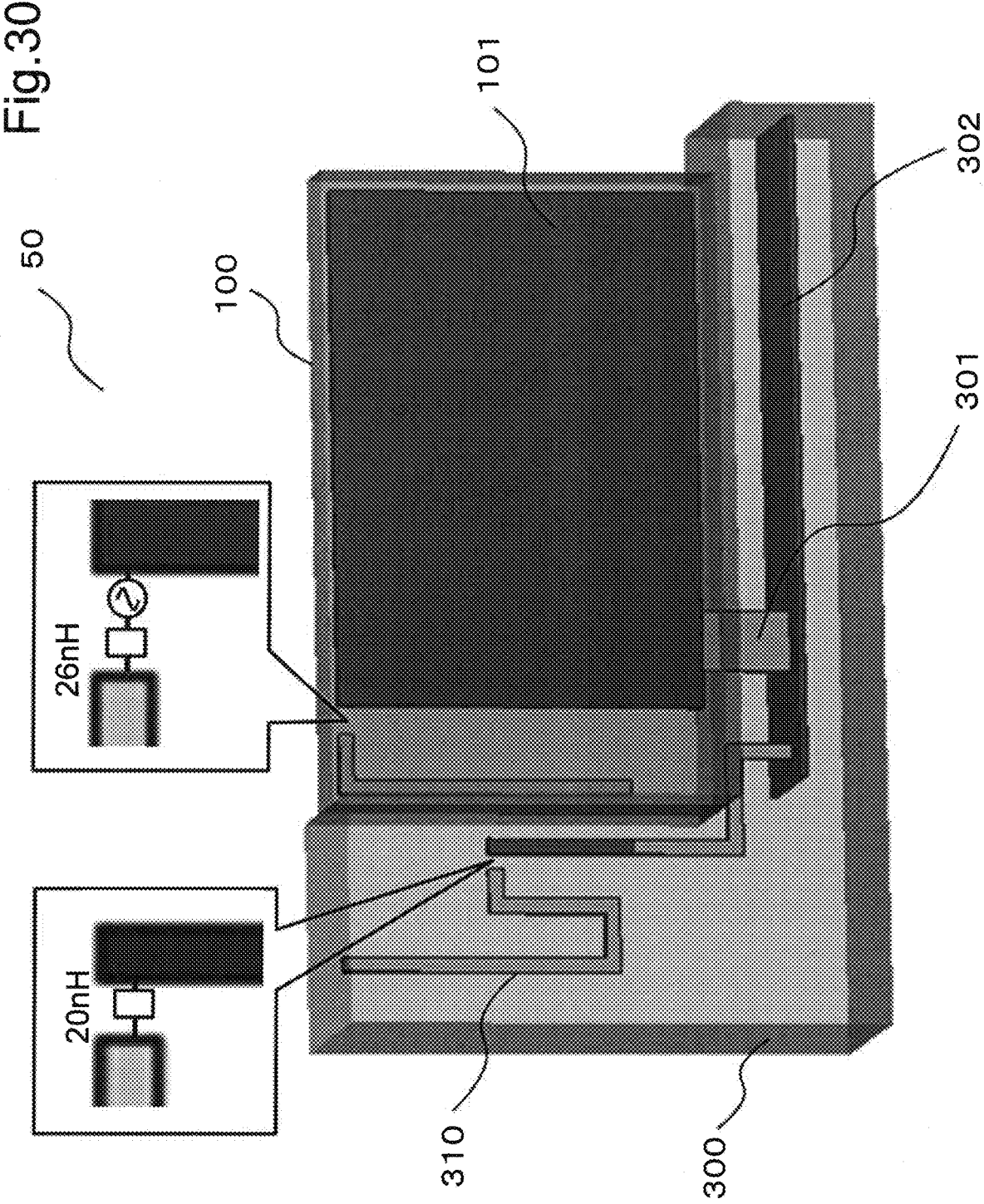
FIG. 30 is a diagram illustrating a configuration example of a second example embodiment.

FIG. 30 illustrates the configuration of a radio device 50 according to the second example embodiment.

The radio device 50 includes a radio device 100 and a charging station 300. The charging station 300 is frequently used as an accessory to a smartphone or a mobile router to charge a storage battery built in the radio device 100.

The charging station 300 includes a connector 301, a printed board 302, and an antenna 310. The charging station 300 according to the present example embodiment is characterized in that the connector 301 is used instead of the connecting portion 201 that is a component of the cradle illustrated in the first example embodiment.

When the radio device 100 is a terminal incorporating Android®, the body of the radio device 100 generally includes a female micro USB connector as standard equipment. An earth terminal of the female micro USB connector is connected to the conductor plate 101 of the radio device 100. The connector 301 is a male micro USB connector. When the radio device 100 is placed on the charging station 300, the connector 301 is connected to the female connector included in the radio device 100.

Further, the earth terminal of the connector 301 of the charging station 300 is connected to the earth conductor of the printed board 302 which is described below.

Next, the printed board 302 is a printed board incorporating a charging circuit for converting a commercial AC power into a DC power for charging so that a storage battery built in the radio device 100 is charged. The charging station 300 may not incorporate a charging circuit and may include a connector to be connected to another charger. The printed board 302 may incorporate the connector and the connector 301, and a wiring pattern for connecting the both connectors may be formed.

Further, the antenna 310 is connected to the earth conductor of the printed board 302. The basic configuration of the antenna 310 is the same as that of the antenna 210 illustrated in the first example embodiment. Further, the position where the printed board 302 and the antenna 310 are connected and the position where the printed board 302 and the connector 301 are connected are desirably as close as possible.

Figure 33:
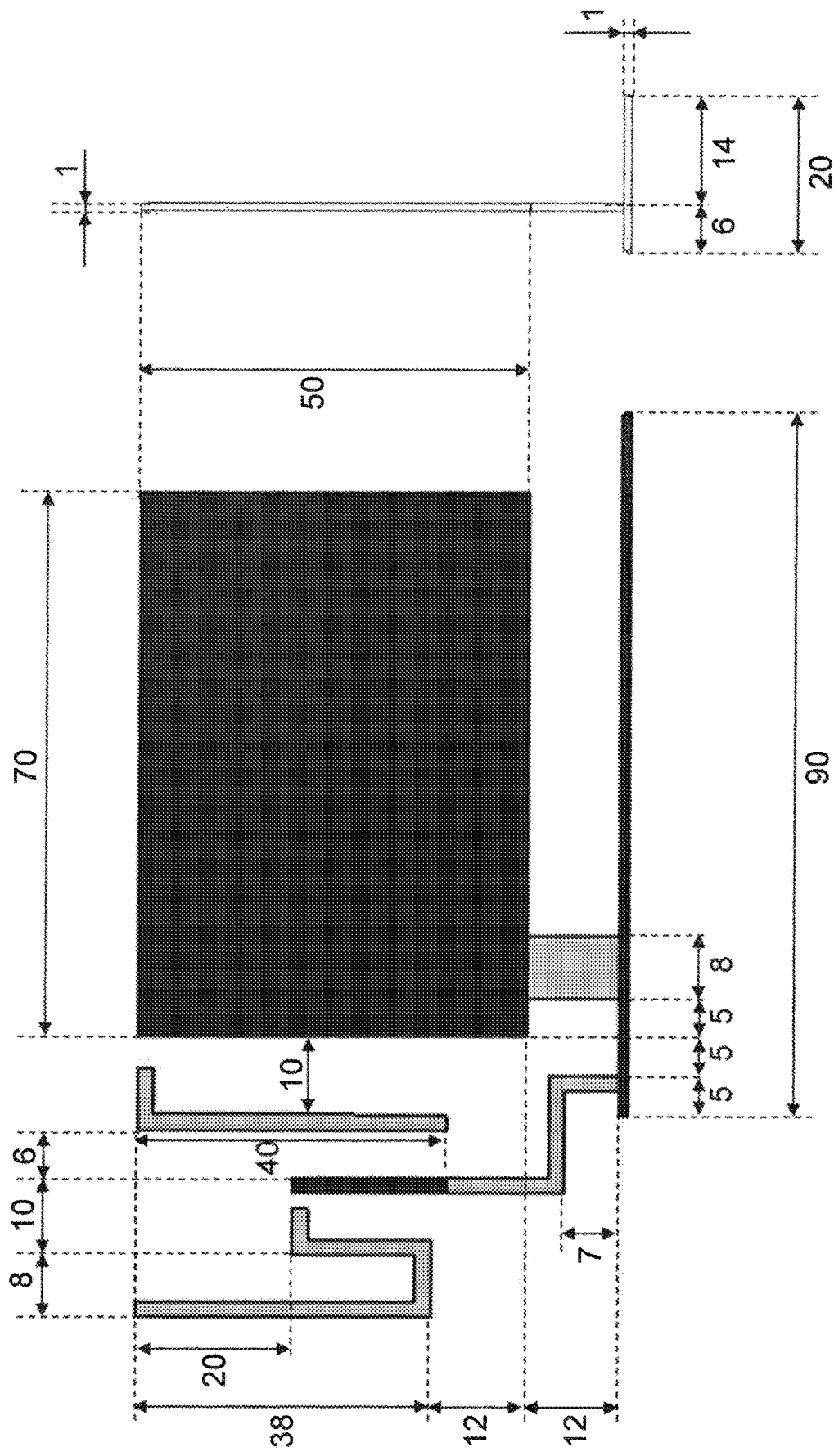
FIG. 33 is a diagram illustrating a configuration example of the second example embodiment.

FIG. 33 illustrates a configuration example of the present example embodiment for performing communication in the vicinity of 800 MHz.

[Description of Operation]

Next, a mechanical operation of the present example embodiment will be described.

According to the configuration of the radio device 50 of the present example embodiment, when the radio device 100 is placed on the charging station 300, the conductor plate 101 of the radio device 100 is connected to the earth conductor of the printed board 302 of the charging station 300 through the connector 301. Since the antenna 310 is connected to the earth conductor of the printed board 302, the conductor plate 101 can be connected to the antenna 310 of the charging station 300 without providing the terminal 103, unlike in the radio device 100 illustrated in the first example embodiment.

Next, an electrical operation of the present example embodiment will be described.

Figure 31:
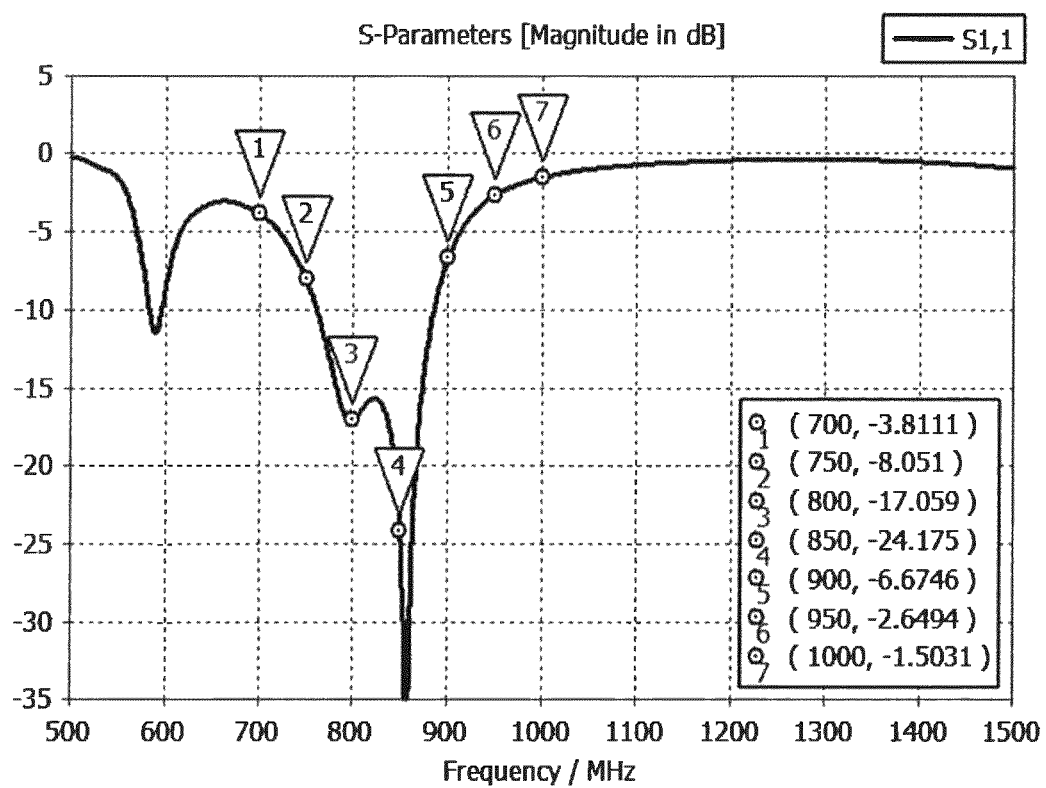
FIG. 31 is a graph illustrating an operation of the second example embodiment.
Figure 32:
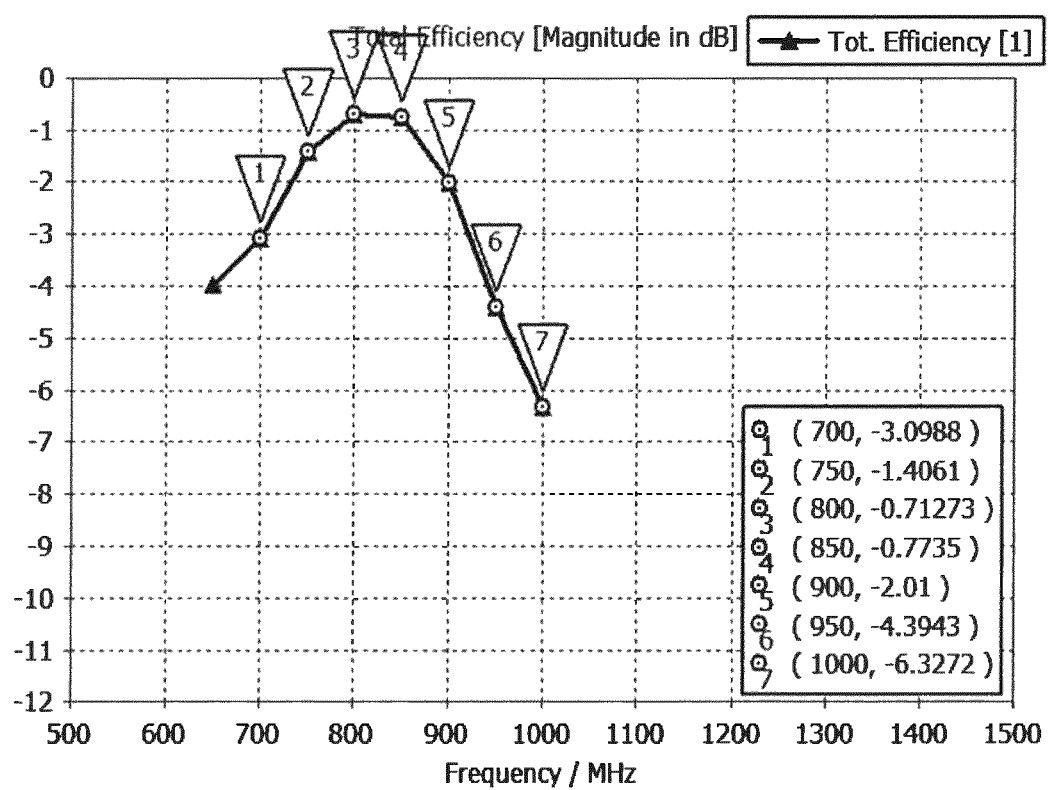
FIG. 32 is a graph illustrating an operation of the second example embodiment.

FIGS. 31 and 32 illustrate high-frequency characteristics of the radio device 50 having a configuration illustrated in FIG. 33. FIG. 31 illustrates a reflection loss in the antenna 110 observed from the power feed unit 102, and FIG. 32 illustrates an antenna efficiency as a ratio between a total electric power of radio waves radiated from the radio device 50 and an electric power to be supplied to the power feed unit 102.

In the high-frequency characteristics of the radio device 100 alone when the radio device 100 is not placed on the charging station 300, as illustrated in FIGS. 11 and 12 used in the description of the first example embodiment, the reflection loss in the vicinity of 800 MHz where the characteristics are most excellent was about 6 dB, and the antenna efficiency was about −2.7 dB. On the other hand, in the high-frequency characteristics of the radio device 50 when the radio device 100 is connected to the charging station 300 of the present example embodiment, as illustrated in FIGS. 31 and 32, the reflection loss in the vicinity of 800 MHz where the characteristics are most excellent is about 15 dB, and the antenna efficiency is about −0.6 dB.

Thus, when the radio device 100 is placed on the charging station 300 and connected to the charging station 300 to operate as the radio device 50, the high-frequency characteristics of the radio device 100 are drastically improved as compared with those of the radio device 100 alone.

As described above, in the radio device 50 of the present example embodiment, a connector generally included in the radio device 100 includes an earth terminal, and the earth terminal is connected to the conductor plate 101. The earth terminal of the connector included in the radio device 100 functions as the terminal 103 illustrated in the first example embodiment.

Further, in the radio device 50 according to the present example embodiment, the earth terminal of the connector 301 is connected to the antenna 210 through the earth conductor of the printed board 302, so that the earth terminal of the connector 301 functions as the connecting portion 201 illustrated in the first example embodiment.

In this manner, also with the configuration of the radio device 50 of the present example embodiment, an external antenna that performs an operation similar to that of the radio device 10 according to the first example embodiment and obtains advantageous effects similar to those of the radio device 10 according to the first example embodiment can be implemented.

Third Example Embodiment

Figure 34:
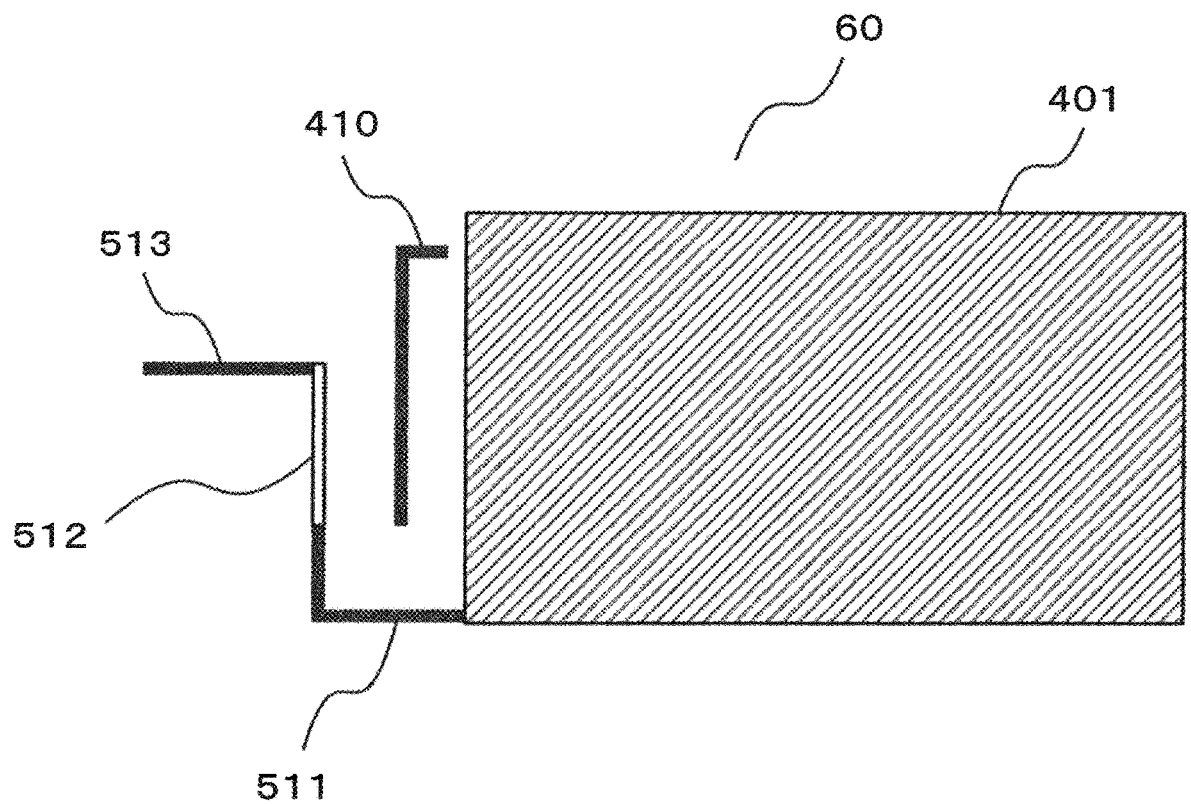
FIG. 34 is a diagram illustrating a configuration example of a third example embodiment.

Next, a third example embodiment will be described with reference to FIG. 34.

An antenna 60 according to the present example embodiment includes a conductor plate 401 and a first linear conductor 410 that includes a portion disposed substantially in parallel to an edge of the conductor plate 401, and is curved halfway and connected to the conductor plate 401 with a gap interposed therebetween. The antenna 60 further includes a second linear conductor 511 that is connected to the conductor plate 401 and intersects with a line extending from an end of the conductor plate 401 opposite to a connection end where the first linear conductor 410 is connected to the conductor plate 401. The antenna 60 also includes a third linear conductor 512 that is connected to an end of the second linear conductor 511 opposite to an end thereof connected to the conductor plate 401 and is disposed substantially in parallel to the first linear conductor 410. The antenna 60 also includes a fourth linear conductor 513 that is disposed in a direction apart from the conductor plate 401 at an end of the third linear conductor 512 opposite to an end thereof connected to the second linear conductor 511.

In this manner, the antenna 60 of the present example embodiment can be implemented as an external antenna with a simple configuration.

Although suitable example embodiments of the present invention have been described above, the present invention is not limited to the example embodiments described above and can be expanded or modified as follows.

Figure 35:
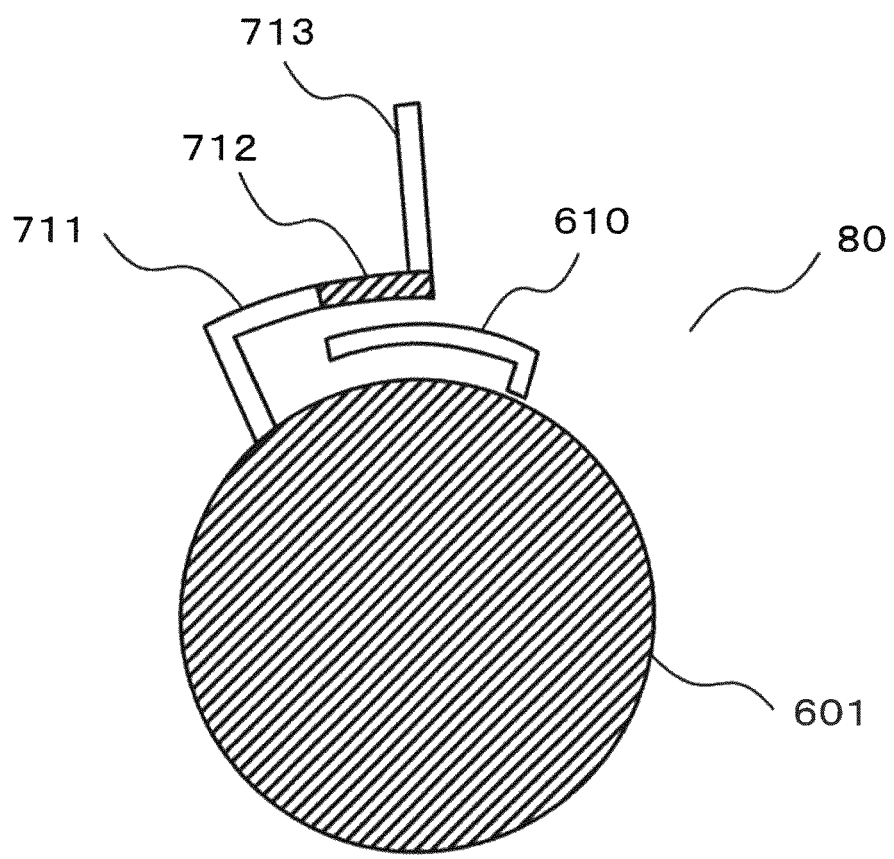
FIG. 35 is a diagram illustrating a modified example.

The conductor plate 101 of the radio device according to the example embodiments has a rectangular shape, but instead may have any shape. For example, when a conductor plate 601 has a shape close to a circular shape, like in a radio device 80 illustrated in FIG. 35, the components of the conductor plate 601 respectively corresponding to the components illustrated in FIG. 2 described in the first example embodiment are as follows. The antenna 110 corresponds to an antenna 610, the element 211 corresponds to an element 711, the element 212 corresponds to an element 712, and the element 213 corresponds to an element 713.

Further, the length corresponding to (La+Lb+Lc) in Expression 4 is a longer one of circumferential lengths of the conductor plate 601 connecting a position where the antenna 610 is connected to the conductor plate 601 and a position where the element 711 is connected to the conductor plate 601. Further, the antenna 610 can be designed using Expression 4 also for the radio device 80. Thus, even when the conductor plate has any shape other than a rectangular shape, the radio device according to the present invention can be implemented.

In the first example embodiment, the inconvenience caused when the interval of the parallel portion between the element 212 and the antenna 110 is extremely small and space coupling between the element 212 and the antenna 110 is extremely strong has been described. This inconvenience is caused due to difference in resonance frequency when the radio device 100 is used alone without being placed on the cradle 200 and when the radio device 100 is placed on the cradle 200.

However, there is no need for the radio device 100 to operate alone as long as the radio device 10 has an integrated configuration that is not separated into the radio device 100 and the cradle 200. In this case, the interval of the parallel portion between the element 212 and the antenna 110 may have a value that is smaller than the interval that is 0.01 times the communication frequency, which is illustrated as the wavelength corresponding to the communication frequency described above.

The whole or part of the example embodiments described above can be described as, but not limited to, the following supplementary notes.

(Supplementary Note 1)

An antenna including:
a conductor plate;
a first linear conductor including a portion disposed substantially in parallel to an edge of the conductor plate, the first linear conductor being curved halfway and connected to the conductor plate with a gap interposed therebetween;
a second linear conductor connected to the conductor plate, the second linear conductor intersecting with a line extending from an end of the first linear conductor opposite to a connection end where the first linear conductor is connected to the conductor plate;
a third linear conductor connected to an end of the second linear conductor opposite to an end thereof connected to the conductor plate, the third linear conductor being disposed substantially in parallel to the first linear conductor; and
a fourth linear conductor disposed in a direction apart from the conductor plate at an end of the third linear conductor opposite to an end thereof connected to the second linear conductor.

(Supplementary Note 2)

An antenna including:
a first antenna including:
a conductor plate; and
a first linear conductor including a portion disposed substantially in parallel to an edge of the conductor plate, the first linear conductor being curved halfway and connected to the conductor plate with a gap interposed therebetween; and
a second antenna including:
a second linear conductor connected to the conductor plate with a connecting portion detachably attached to the conductor plate, the second linear conductor intersecting with a line extending from an end of the first linear conductor opposite to a connection end where the first linear conductor is connected to the conductor plate;
a third linear conductor connected to an end of the second linear conductor opposite to an end thereof connected to the connecting portion, the third linear conductor being disposed substantially in parallel to the first linear conductor; and
a fourth linear conductor disposed in a direction apart from the conductor plate at an end of the third linear conductor opposite to an end thereof connected to the second linear conductor.

(Supplementary Note 3)

The antenna according to Supplementary note 2, in which the second antenna is disposed on a cradle of the first antenna.

(Supplementary Note 4)

The antenna according to any one of Supplementary notes 1 to 3, in which a length of the first linear conductor is substantially one-fourth of a wavelength corresponding to a frequency used for communication.

(Supplementary Note 5)

The antenna according to any one of Supplementary notes 1 to 4, in which an interval between the first linear conductor and the third linear conductor is 0.01 to 0.03 times longer than a wavelength corresponding to a frequency used for communication.

(Supplementary Note 6)

The antenna according to any one of Supplementary notes 1 to 5, in which a total of lengths of the second linear conductor, the third linear conductor, and the fourth linear conductor is a value obtained by subtracting a distance of a longer one of circumferential lengths of the conductor plate connecting a node between the first linear conductor and the conductor plate to a node between the second linear conductor and the conductor plate, from a length substantially three-fourths of a wavelength corresponding to a frequency used for communication.

(Supplementary Note 7)

The antenna according to any one of Supplementary notes 1 to 6, in which the conductor plate has a rectangular shape, the first linear conductor is connected to a vicinity of an end of one side of the conductor plate, and the second linear conductor is connected to a vicinity of an end on a side of the conductor plate opposite to the one side.

(Supplementary Note 8)

A radio device including:
the antenna according to Supplementary note 1; and
a radio circuit.

(Supplementary Note 9)

A radio device including:
a first device including:
a conductor plate;
a first linear conductor including a portion disposed substantially in parallel to an edge of the conductor plate, the first linear conductor being curved halfway and connected to the conductor plate with a gap interposed therebetween; and
a radio circuit, and
a second device including:
a second linear conductor connected to the conductor plate with a connecting portion detachably attached to the conductor plate, the second linear conductor intersecting with a line extending from an end of the first linear conductor opposite to a connection end where the first linear conductor is connected to the conductor plate;

a third linear conductor connected to an end of the second linear conductor opposite to an end thereof connected to the connecting portion, the third linear conductor being disposed substantially in parallel to the first linear conductor; and a fourth linear conductor disposed in a direction apart from the conductor plate at an end of the third linear conductor opposite to an end thereof connected to the second linear conductor.

(Supplementary Note 10)

The radio device according to Supplementary note 9, in which the second device is built in a mounting device for the first device.

(Supplementary Note 11)

The radio device according to Supplementary note 9, in which the second device is built in a charging device for charging the first device, and the connecting portion is at least one terminal of a charging terminal connecting the first device and the second device, the first device being placed on the charging device.

(Supplementary Note 12)

The radio device according to any one of Supplementary notes 8 to 11, in which a length of the first linear conductor is substantially one-fourth of a wavelength corresponding to a frequency used for communication.

(Supplementary Note 13)

The radio device according to any one of Supplementary notes 8 to 12, in which an interval between the first linear conductor and the third linear conductor is 0.01 to 0.03 times longer than a wavelength corresponding to a frequency used for communication.

(Supplementary Note 14)

The radio device according to any one of Supplementary notes 8 to 13, in which a total of lengths of the second linear conductor, the third linear conductor, and the fourth linear conductor is a value obtained by subtracting a distance of a longer one of circumferential lengths of the conductor plate connecting a node between the first linear conductor and the conductor plate to a node between the second linear conductor and the conductor plate, from a length substantially three-fourths of a wavelength corresponding to a frequency used for communication.

(Supplementary Note 15)

The radio device according to any one of Supplementary notes 8 to 14, in which the conductor plate has a rectangular shape, the first linear conductor is connected to a vicinity of an end of one side of the conductor plate, and the second linear conductor is connected to a vicinity of an end on a side of the conductor plate opposite to the one side.

(Supplementary Note 16)

A mounting device for a radio device, including:

a connecting portion being connectable to a conductor plate of the radio device, the radio device including: the conductor plate; a first linear conductor including a portion disposed substantially in parallel to an edge of the conductor plate, the first linear conductor being curved halfway and connected to the conductor plate with a gap interposed therebetween; and a radio circuit;

a second linear conductor connected to the conductor plate with the connecting portion, the second linear conductor intersecting with a line extending from an end of the first linear conductor opposite to a connection end where the first linear conductor is connected to the conductor plate;

a third linear conductor connected to an end of the second linear conductor opposite to an end thereof connected to the connecting portion, the third linear conductor being disposed substantially in parallel to the first linear conductor; and a fourth linear conductor disposed in a direction apart from the conductor plate at an end of the third linear conductor opposite to an end thereof connected to the second linear conductor.

(Supplementary Note 17)

The mounting device according to Supplementary note 16, in which a length of the first linear conductor is substantially one-fourth of a wavelength corresponding to a frequency used for communication.

(Supplementary Note 18)

The mounting device according to Supplementary note 16 or 17, in which an interval between the first linear conductor and the third linear conductor is 0.01 to 0.03 times longer than a wavelength corresponding to a frequency used for communication.

(Supplementary Note 19)

The mounting device according to any one of Supplementary notes 16 to 18, in which a total of lengths of the second linear conductor, the third linear conductor, and the fourth linear conductor is a value obtained by subtracting a distance of a longer one of circumferential lengths of the conductor plate connecting a node between the first linear conductor and the conductor plate to a node between the second linear conductor and the conductor plate, from a length substantially three-fourths of a wavelength corresponding to a frequency used for communication.

(Supplementary Note 20)

The mounting device according to any one of Supplementary notes 16 to 19, in which the conductor plate has a rectangular shape, the first linear conductor is connected to a vicinity of an end of one side of the conductor plate, and the second linear conductor is connected to a vicinity of an end on a side of the conductor plate opposite to the one side.

(Supplementary Note 21)

A radio device including:

a conductor plate;

a first linear conductor including a portion disposed substantially in parallel to an edge of the conductor plate, the first linear conductor being curved halfway and connected to the conductor plate with a gap interposed therebetween; and a radio circuit, in which the radio device is connected to a mounting device, the mounting device including:

a connecting portion being connectable to the conductor plate;

a second linear conductor connected to the conductor plate with the connecting portion, the second linear conductor intersecting with a line extending from an end of the first linear conductor opposite to a connection end where the first linear conductor is connected to the conductor plate;

a third linear conductor connected to an end of the second linear conductor opposite to an end thereof connected to the connecting portion, the third linear conductor being disposed substantially in parallel to the first linear conductor; and a fourth linear conductor disposed in a direction apart from the conductor plate at an end of the third linear conductor opposite to an end thereof connected to the second linear conductor.

(Supplementary Note 22)

The radio device according to Supplementary note 21, in which a length of the first linear conductor is substantially one-fourth of a wavelength corresponding to a frequency used for communication.

(Supplementary Note 23)

The radio device according to Supplementary note 21 or 22, in which an interval between the first linear conductor and the third linear conductor is 0.01 to 0.03 times longer than a wavelength corresponding to a frequency used for communication.

(Supplementary Note 24)

The radio device according to any one of Supplementary notes 21 to 23, in which a total of lengths of the second linear conductor, the third linear conductor, and the fourth linear conductor is a value obtained by subtracting a distance of a longer one of circumferential lengths of the conductor plate connecting a node between the first linear conductor and the conductor plate to a node between the second linear conductor and the conductor plate, from a length substantially three-fourths of a wavelength corresponding to a frequency used for communication.

(Supplementary Note 25)

The radio device according to any one of Supplementary notes 21 to 24, in which the conductor plate has a rectangular shape, the first linear conductor is connected to a vicinity of an end of one side of the conductor plate, and the second linear conductor is connected to a vicinity of an end on a side of the conductor plate opposite to the one side.

(Supplementary Note 26)

A charging device for a radio device, including:

a charging terminal including at least one terminal being connectable to a conductor plate of the radio device, the radio device including: the conductor plate; a first linear conductor including a portion disposed substantially in parallel to an edge of the conductor plate, the first linear conductor being curved halfway and connected to the conductor plate with a gap interposed therebetween; and a radio circuit;

a second linear conductor connected to the conductor plate with the at least one terminal, the second linear conductor intersecting with a line extending from an end of the first linear conductor opposite to a connection end where the first linear conductor is connected to the conductor plate;

a third linear conductor connected to an end of the second linear conductor opposite to the at least one terminal, the third linear conductor being disposed substantially in parallel to the first linear conductor; and a fourth linear conductor disposed in a direction apart from the conductor plate at an end of the third linear conductor opposite to an end thereof connected to the second linear conductor.

(Supplementary Note 27)

The charging device according to Supplementary note 26, in which a length of the first linear conductor is substantially one-fourth of a wavelength corresponding to a frequency used for communication.

(Supplementary Note 28)

The charging device according to Supplementary note 26 or 27, in which an interval between the first linear conductor and the third linear conductor is 0.01 to 0.03 times longer than a wavelength corresponding to a frequency used for communication.

(Supplementary Note 29)

The charging device according to any one of Supplementary notes 26 to 28, in which a total of lengths of the second linear conductor, the third linear conductor, and the fourth linear conductor is a value obtained by subtracting a distance of a longer one of circumferential lengths of the conductor plate connecting a node between the first linear conductor and the conductor plate to a node between the second linear conductor and the conductor plate, from a length substantially three-fourths of a wavelength corresponding to a frequency used for communication.

(Supplementary Note 30)

The charging device according to any one of Supplementary notes 26 to 29, in which the conductor plate has a rectangular shape, the first linear conductor is connected to a vicinity of an end of one side of the conductor plate, and the second linear conductor is connected to a vicinity of an end on a side of the conductor plate opposite to the one side.

The present invention has been described above with reference to the example embodiments as exemplary examples. However, the present invention is not limited to the example embodiments described above. That is, the present invention can be applied to various modes that can be understood by those skilled in the art within the scope of the present invention.

This application is based upon and claims the benefit of priority from Japanese patent application No. 2015-142796, filed on Jul. 17, 2015, the disclosure of which is incorporated herein in its entirety by reference.

REFERENCE SIGNS LIST

10 Radio device
15 Current
16 Current
17 Current
18 Equivalent conductor
19 Current
20 Current
21 Current
22 Current
23 Current
24 Virtual dipole antenna
25 Virtual dipole antenna
39 Virtual dipole antenna
40 Virtual dipole antenna
41 Virtual dipole antenna
50 Radio device
60 Antenna
80 Radio device
100 Radio device
101 Conductor plate
102 Power feed unit
103 Terminal
104 Inductor
110 Antenna
150 Radio device
151 Built-in antenna
152 Radio circuit
153 Switch
154 Transmission line
155 Connector
160 Cradle
161 External antenna
162 Connector
163 Transmission line
200 Cradle
201 Connecting portion
202 Inductor
210 Antenna
211 Element
212 Element
213 Element
300 Charging station
301 Connector
310 Antenna 401 Conductor plate
410 First linear conductor
511 Second linear conductor
512 Third linear conductor
513 Fourth linear conductor
601 Conductor plate
610 Antenna
711 Element
712 Element
713 Element

What is claimed is:

1. An antenna comprising:
   a first antenna including
      a conductor plate, and
      a first linear conductor including a portion disposed substantially in parallel to an edge of the conductor plate, and being curved halfway of the length of the first linear conductor and connected to the conductor plate with a gap being interposed; and
   a second antenna including
      a second linear conductor intersecting with a line extending from an end of the first linear conductor opposite to a connection end thereof connected to the conductor plate, and being connected to the conductor plate with a detachably attached connecting portion,
      a third linear conductor being connected to an end of the second linear conductor opposite to the connecting portion, and being disposed substantially in parallel to the first linear conductor, and
      a fourth linear conductor being disposed in a direction apart from the conductor plate at an end of the third linear conductor opposite to an end thereof connected to the second linear conductor;
   wherein the second antenna is disposed on a cradle of the first antenna.

2. The antenna according to claim 1,
   wherein a length of the first linear conductor is substantially one-fourth of a wavelength corresponding to a frequency used for communication.

3. The antenna according to claim 1,
   wherein a length of the first linear conductor is substantially one-fourth of a wavelength corresponding to a frequency used for communication.

4. The antenna according to claim 1,
   wherein an interval between the first linear conductor and the third linear conductor is 0.01 to 0.03 times longer than a wavelength corresponding to a frequency used for communication.

5. The antenna according to claim 1,
   wherein an interval between the first linear conductor and the third linear conductor is 0.01 to 0.03 times longer than a wavelength corresponding to a frequency used for communication.

6. A radio device including:
   a first device including:
      a conductor plate;
      a first linear conductor including a portion disposed substantially in parallel to an edge of the conductor plate, the first linear conductor being curved halfway of the length of the first linear conductor and connected to the conductor plate with a gap interposed therebetween; and
      a radio circuit, and
   a second device including:
      a second linear conductor connected to the conductor plate with a connecting portion detachably attached to the conductor plate, the second linear conductor intersecting with a line extending from an end of the first linear conductor opposite to a connection end where the first linear conductor is connected to the conductor plate;
      a third linear conductor connected to an end of the second linear conductor opposite to an end thereof connected to the connecting portion, the third linear conductor being disposed substantially in parallel to the first linear conductor; and
      a fourth linear conductor disposed in a direction apart from the conductor plate at an end of the third linear conductor opposite to an end thereof connected to the second linear conductor;
   wherein the second device is built in a mounting device for the first device.

7. A radio device including:
   a first device including:
      a conductor plate;
      a first linear conductor including a portion disposed substantially in parallel to an edge of the conductor plate, the first linear conductor being curved halfway of the length of the first linear conductor and connected to the conductor plate with a gap interposed therebetween; and
      a radio circuit, and
   a second device including:
      a second linear conductor connected to the conductor plate with a connecting portion detachably attached to the conductor plate, the second linear conductor intersecting with a line extending from an end of the first linear conductor opposite to a connection end where the first linear conductor is connected to the conductor plate;
      a third linear conductor connected to an end of the second linear conductor opposite to an end thereof connected to the connecting portion, the third linear conductor being disposed substantially in parallel to the first linear conductor; and
      a fourth linear conductor disposed in a direction apart from the conductor plate at an end of the third linear conductor opposite to an end thereof connected to the second linear conductor,
   wherein the second device is built in a charging device for charging the first device, and the connecting portion is at least one terminal of a charging terminal connecting the first device and the second device, the first device being placed on the charging device.

* * * * *